(12) United States Patent
Liu et al.

(10) Patent No.: US 8,150,433 B2
(45) Date of Patent: Apr. 3, 2012

(54) BEAMFORMING METHOD FOR WIRELESS COMMUNICATION SYSTEMS AND APPARATUS FOR PERFORMING THE SAME

(75) Inventors: Li Liu, Aliso Viejo, CA (US); Hamid Jafarkhani, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 916 days.

(21) Appl. No.: 12/063,851

(22) PCT Filed: Aug. 15, 2006

(86) PCT No.: PCT/US2006/032078
§ 371 (c)(1),
(2), (4) Date: Jul. 24, 2008

(87) PCT Pub. No.: WO2007/022330
PCT Pub. Date: Feb. 22, 2007

(65) Prior Publication Data
US 2009/0298424 A1    Dec. 3, 2009

Related U.S. Application Data

(60) Provisional application No. 60/708,945, filed on Aug. 16, 2005.

(51) Int. Cl.
*H04B 15/00* (2006.01)
(52) U.S. Cl. .................................. 455/504; 455/506
(58) Field of Classification Search .................. None
See application file for complete search history.

(56) References Cited

U.S. PATENT DOCUMENTS

| | | | |
|---|---|---|---|
| 6,101,399 A * | 8/2000 | Raleigh et al. | 455/561 |
| 2001/0033622 A1 * | 10/2001 | Jongren et al. | 375/267 |
| 2004/0178951 A1 * | 9/2004 | Ponsford et al. | 342/192 |
| 2005/0047517 A1 * | 3/2005 | Georgios et al. | 375/267 |
| 2006/0056531 A1 | 3/2006 | Le et al. | |

OTHER PUBLICATIONS

Notification of Transmittal of the International Search Authority, Written Opinion for International Application No. PCT/US06/32078 dated Mar. 31, 2008, 11 pages.

* cited by examiner

*Primary Examiner* — Yuwen Pan
*Assistant Examiner* — Ayodeji Ayotunde
(74) *Attorney, Agent, or Firm* — Daniel L. Dawes; Marcus C. Dawes

(57) ABSTRACT

An improvement in a method of transmit beamforming between a transmitter (16) and a receiver (18) for a time varying lading channel comprises the step of performing transmit beamforming using less than complete knowledge of the previous fading blocks to design a codebook (26a) of a current fading block with each time frame. One embodiment comprises a successive beamforming algorithm and a second embodiment comprises a vector quantization beamforming algorithm. A fading parameter $\alpha$ is determined at least in the transmitter or receiver by monitoring a mobile Doppler frequency.

45 Claims, 11 Drawing Sheets

BEAMFORMING METHOD FOR WIRELESS COMMUNICATION SYSTEMS AND APPARATUS FOR PERFORMING THE SAME

RELATED APPLICATIONS

The present application is related to U.S. Provisional Patent Application Ser. No. 60/708,945, filed on Aug. 16, 2005, which is incorporated herein by reference and to which priority is claimed pursuant to 35 USC 119.

BACKGROUND OF THE INVENTION

1. Field of the Invention

The invention relates to methods wireless digital beamforming and in particular to beamforming for a time varying fading channel.

2. Description of the Prior Art

Beamforming is a signal processing technique used with arrays of transmitters or receivers that controls the directionality of, or sensitivity to, a radiation pattern. When receiving a signal, beamforming can increase the gain in the direction of wanted signals and decrease the gain in the direction of interference and noise. When transmitting a signal, beamforming can increase the gain in the direction the signal is to be sent. This is done by creating beams and nulls in the radiation pattern. Beamforming can also be thought of as spatial filtering.

Beamforming takes advantage of interference to change the directionality of the array. When transmitting, a beamformer controls the amplitude and phase of the signal at each transmitter, in order to create a pattern of constructive and destructive interference in the wavefront. When receiving, information from different sensors is combined in such a way that the expected pattern of radiation is preferentially observed.

The signal from each antenna is amplified by a different "weight." When that weight is negative by just the right amount, noise received by that antenna can exactly cancel out the same noise received by some other antenna, causing a "null." This is useful to ignore noise or jammers in one particular direction, while listening for events in other directions.

Conventional beamformers use a fixed set of weightings and time-delays to combine the signals from the sensors in the array, primarily using only information about the location of the sensors in space and the wave directions of interest. In contrast, beamforming techniques, generally combine this information with properties of the signals actually received by the array, typically to improve rejection of unwanted signals from other directions. As the name indicates, an beamformer is able to automatically adapt its response to different situations.

Transmit beamforming has been widely adopted for wireless systems with multiple transmit antennas. For a block fading channel, the Grassmannian beamformer has been shown to provide the best performance for given amount of feedback. However, the original Grassmannian beamformer does not take the time domain correlation of the channel fading into consideration.

Multiple-input multiple-output (MIMO) systems offer much larger channel capacity over traditional single-input single-output (SISO) systems. Recently, many transmit-beamforming algorithms have been developed to exploit the high capacity in the MIMO systems. The transmit-beamforming schemes require certain amount of channel state information (channel state information) at the transmitter. Typically, the channel state information is conveyed from the receiver to the transmitter through a feedback link. It has been shown in the art that, even with limited feedback, a good beamforming scheme can provide significant amount of array processing gain. In a slow fading environment, the performance of the transmit beamforming algorithms is usually better than that of the open-loop algorithms (algorithms based on the space-time coding). This is because extra channel information is utilized to fine tune the transmitted signal to fit the channel situation.

When perfect channel knowledge is available at the transmitter, the conventional eigen beamformer provides the best performance. However, in a practical wireless communication system, the feedback channel is band limited. The channel state information is quantized using only a few binary bits. It is of special interest to design efficient transmit beamforming schemes that are based on finite rate feedback. In the art, a universal lower bound on the outage probability of finite feedback beamformer is established for a block fading model. It is demonstrated that the relative loss in outage performance from finite feedback case decreases exponentially with the number of feedback bits. In addition, a design criterion has been introduced for finite rate beamforming. This design criterion minimizes the maximum inner product between any two beamforming weights in the beamformer codebook, and the codebook problem is shown to be equivalent to the line packing problem in the Grassmannian manifold.

Several prior art beamformers have also been constructed based on the finite rate feedback constrain. It has been shown that beamforming codebook constructed based on the maximum receive SNR approach will result in the same Grassmannian beamforming criterion as previously known. Many beamforming codebooks have been constructed for the practical MIMO systems. Recently, the Grassmannian beamforming algorithm is further investigated and its SNR performance as well as symbol error rate have been accurately quantified for a given number of feedback bits.

The above transmit beamforming algorithms assume a block fading model, i.e., the MIMO channels fade independently from one frame to the next frame. However, in an ordinary wireless system, the actual channel coefficients exhibit strong inter-frame correlation. An efficient beamforming scheme should utilize this correlation and reduce the amount of feedback. A class of beamforming schemes that exploits the inter-frame correlation in channel fading have been previously introduced. This class of algorithms is called gradient feedback (GFB) beamforming algorithm. The gradient feedback algorithm applies several random perturbed transmission weights on top of the normal beamforming weight. Then a few feedback bits from the receiver 18 select the perturbed weight vector which provides the highest receive power. It has been shown that the weight adaptation in gradient feedback can be approximated by a coarse gradient adaptation. Furthermore, the performance of the gradient feedback scheme has been analyzed in terms of convergence and tracking of an auto-regressive dynamic fading model (AR1).

BRIEF SUMMARY OF THE INVENTION

The illustrated embodiments of the invention are directed to transmit beamforming for a time varying fading channel instead of to a quasi-static fading channel as in the prior art. The effect of Doppler shifting is considered in the illustrated embodiments. As a result, time domain mutual correlations have been exploited in the channel fading. The resulting beamforming scheme works better in real world time-selective wireless systems than the prior art approaches. The approach of the invention is successive while the prior art methods are not successive.

The illustrated embodiments of the invention relate to the application of vector quantization (vector quantization) technology on transmit beamforming systems. In particular, the illustrated embodiments apply vector quantization technology With memories (including predictive vector quantization and finite state vector quantization) on transmit beamforming systems. As a result, we successfully construct the predicted vector quantization beamformer. The prior art disadvantage addressed in this research is the design and evaluation of the special beamforming distance metric for the training of the generalized Lloyd algorithm.

Thus, the illustrated embodiments of the invention include a successive beamforming algorithm for transmit beamforming systems using a successive beamforming adaptive codebook. As a result, we successfully construct a time-varying beamforming adaptive codebook based on the knowledge from previous fading block. The major disadvantage addressed in this research is a systematic successive adaptive codebook strategy that can provide easy storage, synchronized adaptation, as well as decent beamforming gains. Overall, the successive beamforming system can be easily implemented.

The purpose of the invention is to improve the reliability, flexibility, data rate, and performance (in terms of SNR, bit error, or capacity) of the wireless systems.

One of the principles used in the illustrated embodiments is the exploitation of the time domain correlations in the channel fading to perform the transmit beamforming. Basically, the transmit weight from the previous fading block is used to carry out transmit beamforming on the current fading block.

One advantage of the illustrated embodiments is that we use the same number of feedback bits for our transmit beamforming systems. However, we accomplish much better performance in terms of reliability, SNR, capacity, bit error rate than any existing prior art system. The performance gain is especially large at slow fading speeds.

Another major advantage is that the illustrated embodiments is that they enjoy easy implementation. In the successive beamforming scheme, only a single codebook is required on both sides of the wireless link. There is no need to have multiple codebooks for the different fading speeds.

Finally, our design approach is general and systematic. It can be extended to any number of transmit antennas, any number of feedback bits, and any fading speeds.

The illustrated embodiments can be used for the existing and next generation wireless communication systems. It can be adopted for any wireless system with multiple transmit antennas. For example, it be can adopted for 3G wireless system, or the residential WiFi or WiMax systems. Another major area of application is the communication systems in the defense industry.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

FIG. 2$b$ is a functional block diagram illustrating a closed-loop encoder of the invention.

FIG. 2$c$ is a functional block diagram illustrating a closed-loop decoder of the invention.

Figure 1:
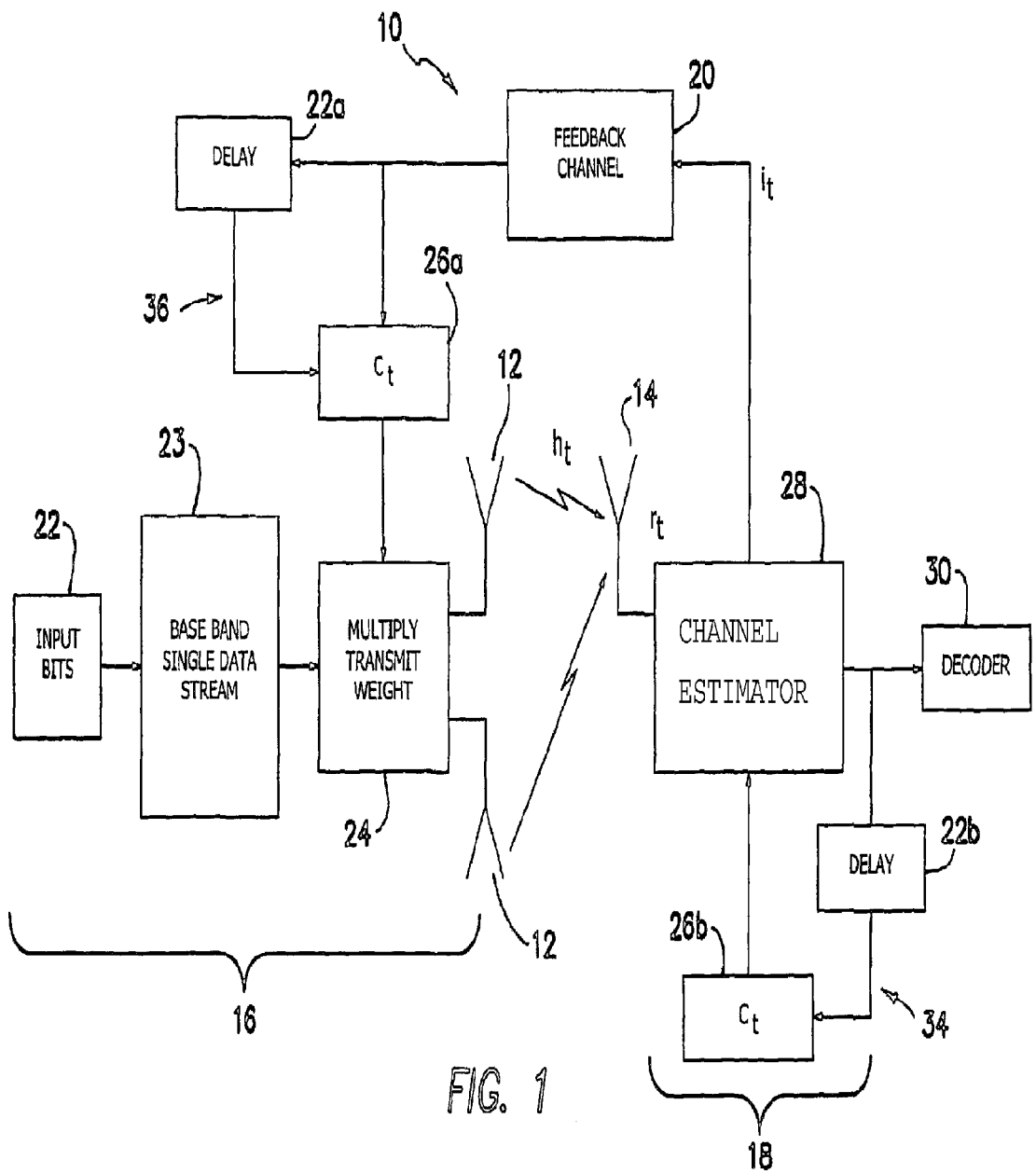
FIG. 1 is a simplified block diagram of a wireless system in which the methods of the invention are implemented.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Based on a first order auto-regressive (AR1) dynamic fading model, we develop two new classes of beamforming algorithms that exploit the inter-frame correlations in the channel fading. We first introduce an algorithm based on a predictive vector quantization (predictive vector quantization) approach. The resulting predictive vector quantization beamformer accomplishes superior power delivery at the receiver 18. However, the error performance of the predictive vector quantization beamformer is not satisfactory at high SNRs, and it also has a high implementation complexity.

To resolve these issues, we then develop a novel successive beamforming (SBF) algorithm. The new SBF scheme uses the knowledge of the previous fading blocks to aid the beamforming adaptive codebook of the current fading block. The optimal codebook is constructed based on the successive partition of the surface of a spherical cap. The new SBF scheme accomplishes superior performance at both low and high SNRs. Furthermore, it also enjoys easy implementation. Through numerical simulations, we demonstrate that the disclosed predictive vector quantization beamformer and successive beamformer outperform several other previously known beamformers at various fading scenarios.

For the sake of simplicity the illustrated embodiments focus on the design and evaluation of good beamforming schemes for the multiple input single-output (MISO) wireless systems. However, the results can be easily extended to a MIMO system. To model the time varying nature of the channel fading, we adopt an AR1 fading model from B. Banister and J. Zeidler, "A simple gradient sign algorithm for transmit antenna weight adaptation with feedback," IEEE

*Trans. Signal Processing*, vol. 51, pp. 1156-1171, May 2003. Besides the fading model, our approach is novel from the prior art in that we do not use a stochastic adaptation approach.

To exploit the inter-frame correlation in channel fading, we have developed two classes of beamforming algorithms. The first one is based on predictive vector quantization (predictive vector quantization). The resulting predictive vector quantization beamformer accomplishes superior power delivery as well as good error performance at low signal-to-noise ratios (SNRs). However, the error performance of the predictive vector quantization beamformer is not satisfactory at high SNRs, and it also has a high implementation complexity.

To resolve these issues, we then develop a successive beamforming (SBF) algorithm, which is in essence a modified Grassmannian beamforming algorithm. We evaluate the SNR performance for the SBF algorithm in a static fading environment. We then analyze its tracking performance in the AR1 fading environment using a simplified two-step approach. Based on the steady state analysis, we calculate the optimal size of the surface area of the spherical cap for adaptive codebook. To simplify the implementation, we introduce a systematical adaptive codebook strategy based on a slow fading approximation. Finally, we use numerical simulations to confirm that this new beamforming algorithm outperforms several existing beamforming algorithms.

A detailed system model and a SNR design target is disclosed. In addition, we present a novel predictive vector quantization beamforming scheme that accomplishes maximum receive power delivery. We introduce a design criterion for the SBF systems. A systematic codebook construction scheme is also illustrated. Finally, Monte Carlo simulations for the proposed beamforming algorithms are presented In this specification bold uppercase (lowercase) letters denote matrices (column vectors); $(\bullet)^*$; $(\bullet)^T$; $(\bullet)^H$ denote conjugate, transpose, and Hermitian operators, respectively; $x_{ij}$ denotes the element at the ith row and jth column of X; $/\bullet/$ denotes vector norm; $U(\bullet)$ denotes uniform distribution; $Re(x)$; $Im(x)$ stand for the real and imagine part of a complex variable x, respectively; $p(\bullet)$; $E(\bullet)$; $cov(\bullet)$ stand for the probability density function (pdf), mean and covariance of a random variable respectively; 0 denotes the empty set; $e_1 = [1\ 0\ldots 0]^T$ denotes a column vector with every entries being zero except the first entry. $J_0(\bullet)$ denotes the zeroth order Bessel function of the first kind; $\delta_{ij}$ denotes the discrete Dirac delta function.

It is to be further expressly understood that while the invention is described in functional or mathematical terms as an efficient form of expression, the physical means for performing the various steps, processes, and functions disclosed below include any and all known software controlled digital and signal processors, computers, programmed logic arrays, analog logic circuits and all electronic signal processing and conditioning circuits now known or later devised for performing equivalent functions.

Transmit Beamforming for Time-Varying Fading Channels
System Model and Performance Criterion Consider a wireless system 10 with Nt transmit antennas 12 and a single receive antenna 14 as shown in the system block diagram of FIG. 1. Without loss of generality, we assume that the data is transmitted in frames. The digital input bits are provided to a modulator 22 in transmitter 16 which produces a parallel digital output signal $s_t$ for the time frame. The parallel digital output signals $s_t$ are signal condition for transmission as a single data stream by base band circuit 23 and then multiplied or weighted by a weighting vector $w_t$ by transmit multiplier 24. The weighting is taken from a codebook 26a which takes as its inputs a feedback channel 20 from receiver 18 and a delay circuit 22a. The conditioned and weighted signals are then provided to a plurality of antennas 12 for wireless transmission as vector channel signal $h_t$. Codebook 26a, delay circuit 22a and feedback channel 20 comprise in one embodiment the closed loop decoder 36 of FIG. 2c. As described below, FIGS. 2a, 2b and 2c describe a predictive vector quantization embodiment for the encoder comprised of codebook 26, delay circuit 22 and feedback channel 20. Other implementations are possible, such as the successive feedback embodiment also described below. These two embodiments, of course, do not exhaust the number or type of encoders 34 or decoders 36 which could be employed in FIG. 1 which operate consistent with the scope of the claimed invention.

Thus, although data is transmitted from transmitter 16 to receiver 18 as ht, a second wireless transmission of a signal, $I_T$, from receiver 18 to transmitter 16 occurs by which an identical adaptive codebook 26a and 26b are established in data receiver 18 and data transmitter 16. The second transmission may be through the same set of antennas 12 and 14, or through a separate or overlapping set of different antennas (not shown). Thus, it will be disclosed below, that the invention is an improvement in a method of transmit beamforming between a transmitter and a receiver for a time varying fading channel comprising the step of performing transmit beamforming using less than complete knowledge of the previous fading blocks by beamforming a codebook of a current fading block with each time frame. Two embodiments will be illustrated, namely a successive beamforming algorithm and a vector quantization beamforming algorithm. In both embodiments, a fading parameter $\alpha$ is determined in at least the transmitter or receiver by monitoring a mobile Doppler frequency. A best estimated channel direction $\hat{g}_t$ is generated based on the past channel inputs, namely $\hat{g}_t = S(g_{t-1})$ where $S(\bullet)$ denotes a predicting function, $\hat{g}_t$ denotes a best estimate of the current channel direction based on the previous channel direction $g_{t-1}$.

The channel signal $h_t$ is received at antenna 14 as a vector receive signal $r_t$. A channel estimator 28 evaluates the channel state information and generates a feedback signal, $i_t$, on the feedback channel 20 comprised of N bits/frame as described below which is input to the beamforming codebook 26 in transmitter 16. It must be made clear that the information which is fed back through the wireless channel 20 is less than the complete channel information, and can be as little as a single bit. The output of channel estimator 28 is coupled to a maximum likelihood (ML) decoder 30 which reconstructs the transmitted signal as disclosed below. The same form of codebook 26 is used in both the transmitter 16 and receiver 18. Codebook 26b, delay circuit 22b and feedback channel 20 comprise in one embodiment the closed loop encoder 34 of FIG. 2b. Again other implementations are possible, such as the successive feedback embodiment also described below and the two disclosed embodiments do not exhaust the different kinds of embodiments which could be employed in FIG. 1 which operate within the scope of the invention.

At the i th frame, the receive signal in the MISO system is given by $$r_t = h_t^H w_t s_t + n_t; \quad (1)$$

where the transmitted signal at time t is denoted as $s_t$, the receive signal as $r_t$. In this specification as an example only, the signal $s_t$ represents a scalar value drawn from a phase-shift keying (PSK) or quadrature amplitude (QAM) constellation. Furthermore, the energy of $s_t$ satisfies $E_s = E(/s_t/^2)$. The noise parameter $n_t$ is a random variable drawn from an independent identically distributed, zero-mean, white complex Gaussian process with $cov(n_t) = \sigma^2$. The parameter $h_t = (h_{1t}; \ldots; h_{Nt})^T$ represents the channel vector and the entry $h_{it}$; i=1; $\ldots$; $N_t$ represents the channel path gain at the i th transmit antenna at the t th frame. In this specification, the channel vector $h_t$ is assumed to be perfectly known at the receiver 18 and it is generated according to an AR1 fading model $$h_t = \alpha h_{t-1} + \bar{\alpha} x_t; \quad (2)$$

where $x_t$ is an $N_t \times 1$ vector with each entry drawn from an independent identically distributed zero-mean complex white Gaussian process, and its auto covariance function satisfies $E(x_t x_t^H) = I_{Nt}$. As a direct result of the independent identically distributed entries in $x_t$, the channel path gains between any two transmit antennas 12 are also uncorrelated, i.e. $E(h_{it} h^*_{jt}) = \delta_{ij}$. The parameter $\alpha$ in equation (2) defines the fading speed and its value is given in this embodiment by R. Clarke, "A statistical theory of mobile radio reception," *Bell Syst. Tech. J.*, vol. 47, pp. 957-1000, July 1968:

$$\alpha = J_0\left(\frac{2\pi T v_{mb}}{\lambda}\right), \quad (3)$$

where T denotes the duration of each data frame, and it also represents the interval between two consecutive channel feedbacks. The parameters $v_{mb}$ and $\lambda$, denote the mobile speed and carrier wavelength, respectively. In addition, the parameter $\bar{\alpha}$ in equation (2) is simply defined as $\bar{\alpha} = \sqrt{(1-\alpha^2)}$. Note that a in equation (3) is a critical parameter for a transmit beamforming system 10 since it describes the fading speed. A smaller $\alpha$ corresponds to faster fading speed. At the extreme case, $v_{mb} \to \infty$, then $\alpha \to 0$, and the AR1 fading model falls back to a block fading model.

Typically, the fading parameter $\alpha$ is known at both the transmitter 16 and receiver 18 since both sides can monitor the mobile Doppler frequency. Therefore, in the additional embodiments of the invention, we assume that the value of $\alpha$ is known at the transmitter 16. In a practical wireless system, it is also possible to have the receiver 18 send the parameter $\alpha$ to the transmitter 16 for better performance. Since the fading speed changes relatively slower compared to the normal frame duration, the parameter $\alpha$ only needs to be sent back to the transmitter 16 in some rare occasions, hence it incurs little implementation overhead. The quantization on the fading parameter $\alpha$ will be investigated in greater detail below. We will demonstrate that a relative coarse quantization on $\alpha$ is sufficient for the proposed transmit beamforming systems.

In equation (1), the parameter $w_t \triangleq [w_{1t}, \ldots, w_{N_t t}]^T$ represents the transmit weight vector at time t. The value of $w_t$ is selected from a codebook using an instantaneous signal-to-noise ratio criterion at the receiver 18

$$w_t = \underset{c_i \in C}{\operatorname{argmax}} |h_t^H c_i|, \quad (4)$$

where $C = \{c_1, \ldots, c_{2^N}\}$ represents the beamforming codebook. The codebook consists of $2^N$ beamforming weights. Each beamforming weight is an $N_t \times 1$ vector with unit norm, i.e., $\|c_i\|=1$, $\forall i$. In FIG. 1, there is a feedback link 20 dedicated on conveying channel state information from the transmitter 16 to the receiver 18. During each frame of the data transition, the optimal beamforming weight is obtained based on equation (4) and its index is sent back to the transmitter 16 using N binary bits.

The main goal is to provide a good beamforming scheme that can exploit the channel correlation for the systems 10 in FIG. 1. Towards this end, we use the average receive signal-to-noise ratio as the performance metric for the design and analysis of the beamforming system:

$$SNR = \frac{E_s}{\sigma^2} E(|h_t^H w_t|^2) = \frac{E_s}{\sigma^2} E(\rho_t |g_t^H w_t|^2), \quad (5)$$

represent the amplitude and the direction of the current channel, respectively.

a. For a block fading environment, it can be shown that $g_t$ and $\rho_t$ are independent random variables. In addition, $$p(\rho_t) = \frac{\rho_t^{N_t-1} e^{-\rho_t}}{(N_t - 1)!}, \quad (6)$$

and $g_t$ is uniformly distributed on the surface of the unit hypersphere, i.e., $g_t \sim U(\Omega^{N_t})$, where $\Omega^{N_t}$ denotes the surface of the complex $N_t$-dimensional unit hypersphere.

For the independent block fading case, the problem of optimal beamforming adaptive codebook has been solved in the prior art. The resulting design criterion is called the Grassmannian beamforming criterion and it is summarized as follows as Lemma 1. For a MISO system operating in the independent block fading environment with $N_t$ transmit antennas and N feedback bits, an ideal size-$2^N$ beamforming codebook is obtained by solving the following problem:

$$C_{opt} = \arg\max_{\forall C} \min_{\forall i \neq j} d_c(c_i, c_j), \qquad (7)$$

where $d_c(c_i, c_j) \triangleq \sqrt{1-|c_i^H c_j|^2}$ denotes the chordal distance between two unit norm column vectors $c_i$ and $c_j$. In addition, the signal-to-noise ratio performance of the ideal beamformer is upper bounded by $$SNR \leq \frac{E_s}{\sigma^2}\left(N_t - (N_t-1)2^{\frac{-N}{N_t-1}}\right).$$

The above Grassmannian beamformer is only optimal for the block fading scenarios. For the time varying fading scenarios, the above design criterion fails to exploit the interframe correlation between consecutive frames. In what follows, we investigate a new adaptive codebook strategy. The new design strategy will generate transmit weights based on the knowledge of the previous fading block. As a result, the new scheme accomplishes much higher receive signal-to-noise ratio.

Beamforming Based on Predictive Vector Quantization

The beamforming problem above can be cast into an equivalent vector quantization problem:

$$\begin{cases} \text{Source input: } h_t = \alpha h_{t-1} + \bar{\alpha} x_t; \\ \text{Codebook: } C = \{c_1, \ldots, c_{N_t}\}, \|c_i\| = 1; \\ \text{Distortion metric: } \bar{d}(h_t, w_t) = -|h_t^H w_t|^2 = -|g_t^H w_t|^2 \rho_t. \end{cases} \qquad (8)$$

A key observation is that the vector quantization problem in equation (8) and the vector quantization problem in P. Xia and G. Giannakis, "Design and analysis of transmit beamforming based on limited-rate feedback," *IEEE Trans. Signal Processing*, (to be published, hereinafter "Xia") are quite different. The time-varying fading model in equation (2) can be considered a source with memory, whereas the block fading model in Xia is simply a memoryless source. To construct a good codebook for the problem in equation (8), the standard memory-less vector quantization with finite signal dimensionality becomes inferior to the vector quantization algorithms with memory. An algorithm that can exploit time domain correlations should be able to provide better performance.

An effective strategy to incorporate memory into vector quantization is a predictive vector quantization technique. There are other vector quantization schemes that exploit the memory from the signal source, e.g. finite state vector quantization (FSVQ) and combined FSVQ with trellis encoding. However, these techniques have much higher complexity or encoding delays and not presently preferred. In what follows, we use a predictive vector quantization approach to solve the transmit beamforming problem in equation (8).

Figure 2A:
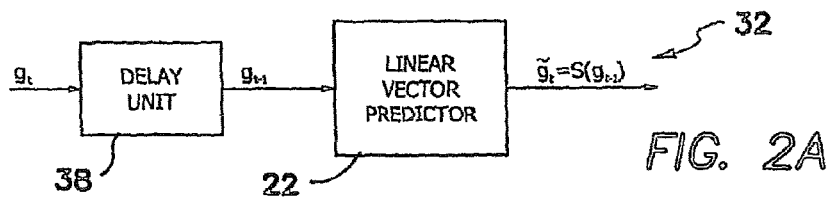
FIG. 2$a$ is a functional block diagram illustrating a first embodiment using a open-loop predictor.
Figure 2B:
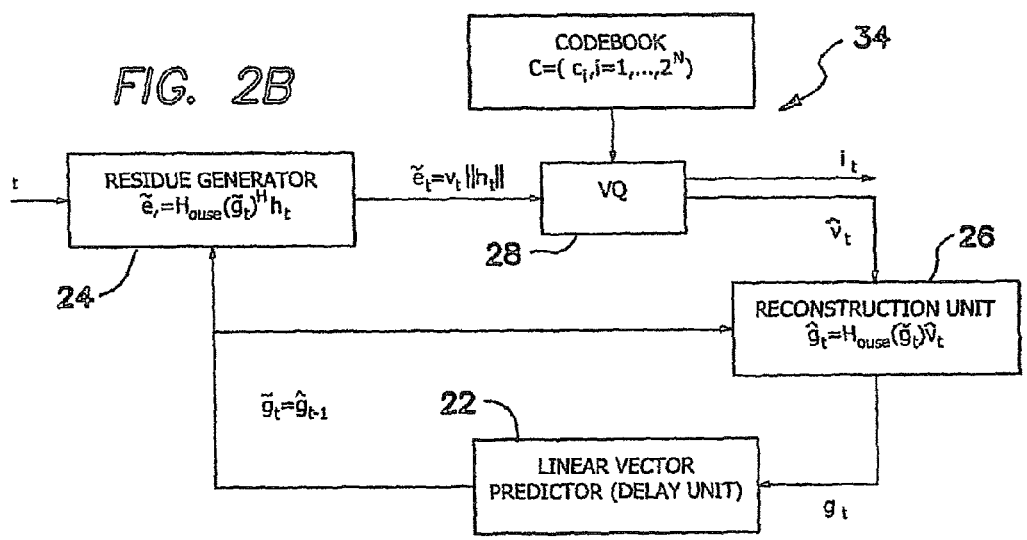
Figure 2C:
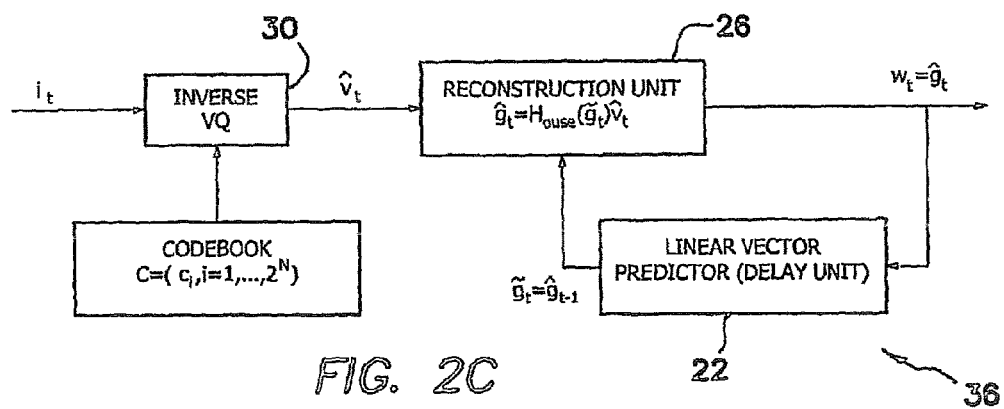

The detailed structure of the predictive vector quantizer is depicted in FIGS. 2a-2c. There are three important blocks in FIGS. 2a-2c that are not seen in the memory-less vector quantization: the linear predictor block 22, the residue generator unit 24, and the reconstruction unit 26. The purpose of the predictor block 22 is to provide the best estimated channel direction $\tilde{g}_t$ based on the past channel inputs.

In this specification, we adopt a simple open-loop approach to design the optimal vector predictor 32. To clarify our derivation, a simple illustration of the open-loop predictor 32 is depicted in the block diagram of FIG. 2a. The open-loop approach has an attractive property that the predictor can be designed first without taking the quantizer into consideration. In the open-loop scheme, the optimal estimation of the current channel direction is based on the actual channel direction, instead of the reconstructed channel direction, of the previous frame. The output from the predictor is expressed as:

$$\tilde{g}_t = S(g_{t-1}); \qquad (9)$$

where $S(\bullet)$ denotes the predicting function, $\tilde{g}_t$ denotes the best estimate of the current channel direction based on the previous channel direction $g_{t-1}$. As shown in the schematic of FIG. 2a the channel direction $\tilde{g}_t$ is input into a delay unit 38, which after one frame becomes the previous channel direction $g_{t-1}$. Linear vector predictor 22 then generates the best estimate $\tilde{g}_t$ of the current channel direction according to equation 9.

Once the predictor 32 has been designed, the residue generator block 24 will convert the original channel vector $h_t$ into a residue vector $\tilde{e}_t$ as depicted in the schematic of FIG. 2b in the closed-loop encoder 34. Due to the special distance metric in equation (8), the simple subtractor unit in the prior art is not usable here. In the predictive vector quantization algorithms, the incorporation of the residue generator unit 24 should not alter the original design target of minimizing the overall quantization distortion. Towards this end, we define a simple linear residue generator 24.

We first introduce a vector space adaptation model based on complex Householder transform. Let $H_{ouse}(y)$ denotes the complex Householder matrix $$H_{ouse}(y) = I - \frac{uu^H}{y^H u},$$

where y is any column vector with unit norm and $u \triangleq y - e_1$. Using this Householder matrix, the actual channel direction $g_t$ can be expressed as a linear function of the predicted channel direction $\tilde{g}_t$ and its orthogonal complements:

$$g_t = H_{ouse}(\tilde{g}_t) v_t,$$

where $v_t$ is an $N_t \times 1$ column vector with unit norm $\|v_t\|=1$. Note that the Householder matrix $H_{ouse}(\tilde{g}_t)$ is a unitary matrix and it has the property that the first column being $\tilde{g}_t$ and the rest of the columns are orthogonal to $\tilde{g}_t$. The physical implication of equation (10) performed by residue generator 24 is that the actual channel direction for the current frame is a linear combination of the predicted channel direction and the subspace orthogonal to it, and the vector $v_t$ contains the linear combination coefficients.

From equation (10), we define the residue vector as:

$$\tilde{e}_t \triangleq H_{ouse}(\tilde{g}_t)^H h_t = H_{ouse}(\tilde{g}_t)^H g_t \|h_t\| = v_t \|h_t\|$$

The residue vector $\tilde{e}_t$ is quantized inside the vector quantization block 28 in FIG. 2b, the quantized residue vector is denoted as $\tilde{v}_t$ and is obtained based on the instant minimum distortion criterion using the distance metric in equation (8):

$$\hat{v}_t = \underset{c_i \in C}{\arg\min}\, \bar{d}(\tilde{e}_t, c_i) = \underset{c_i \in C}{\arg\min} -|\tilde{e}_t^H c_i|^2 = \underset{c_i \in C}{\arg\min} -|v_t^H c_i|^2 \|h_t\|^2. \quad (11)$$

The output from the vector quantization block 28, which is the transmitted feedback signal, it, is used by the reconstruction units 26 at both the encoder 34 in FIG. 2b and the decoder 36 in FIG. 2c, where the channel direction is reconstructed as:

$$\hat{g}_t = H_{ouse}(\tilde{g}_t)\hat{v}_t. \quad (12)$$

Based on the reconstructed channel direction $\hat{g}_t$, the transmit weight at the transmitter 16 is simply given by $w_t = \hat{g}_t$. The transmitted feedback signal it is inversely quantized by inverse VQ block 30 in the decoder 36 to generate $\hat{v}_t$.

The incorporation of the above residue generation unit 24 and reconstruction unit 26 does not change the original design target in equation (8), i.e., the quantization on the residue signal $\tilde{e}_t$ is equivalent to the quantization on $h_t$. To see this equivalence, we rewrite the original design target (minimization of average distortion) as:

$$\begin{aligned}
\min E(\tilde{d}(w_t, h_t)) &= \min - E(|\hat{g}_t^H g_t|^2 \|h_t\|^2) \\
&= \min - E(|\hat{v}_t^H H_{ouse}(\hat{g}_t)^H H_{ouse}(\bar{g}_t)^H v_t|^2 \|h_t\|^2) \\
&= \min - E(|\hat{v}_t^H v_t|^2 \|h_t\|^2) \\
&= \min E(\bar{d}(\hat{v}_t, \bar{e}_t)),
\end{aligned} \quad (13)$$

where the first equality is based on the fact $w_t = \hat{g}_t$, the next two equalities are due to equations (10) and (12) and the fact that householder matrix $H_{ouse}(\tilde{g}_t)$ is unitary, and the last equality is simply due to the definition of the distance metric in equation (8). Based on equation (13), the original minimum distortion design target is accomplished by the quantization on the residue signal $\tilde{e}_t$.

The performance of a predictive vector quantization system is evaluated by its output signal-to-noise ratio. For the above open-loop predictive vector quantization system, the output signal-to-noise ratio can be expressed as the product of two terms $$SNR = \frac{E_s}{\sigma^2} SNR_{predictor} G_{VQ}, \quad (14)$$

where $SNR_{predictor} \triangleq E(|h_t^H \tilde{g}_t|^2) = E(|g_t^H \tilde{g}_t|^2 \|h_t\|^2)$ denotes the output signal-to-noise ratio at the predictor unit 32, $$G_{VQ} \triangleq \frac{E(|h_t^H w_t|^2)}{E(|h_t^H \bar{g}_t|^2)}, \quad (15)$$

denotes the processing gain from the vector quantization unit 28. In the open-loop predictive vector quantization design approach, the optimal predictor unit 32 is designed to provide the maximum signal-to-noise ratio level at its output.

With this background, we can now design the vector predictor unit 22 modeled by equation (9). In this specification, we use a simple first order linear predictor model due for simplicity. The best estimate of the current channel direction based on previous channel input is simply given by:

$$\tilde{g}_t S(g_{t-1}) = H_{ouse}(g_{t-1}) b, \quad (16)$$

where b denotes an $N_t \times 1$ column vector with unit norm $/b/=1$. Similar to equation (10), the physical implication of equation (16) is that the best estimate of the channel direction for the current frame is a linear combination of the channel direction of the previous frame and its orthogonal compliment, and the vector b contains the linear coefficients. For the simple model in equation (16), the optimal linear coefficients $b_1; \ldots ; b_{N_t}$ can be obtained through the maximization of signal-to-noise ratio predictor. In particular, we have the following result:

The linear coefficients that accomplish the highest predictor signal-to-noise ratio are give by $b = [1\ 0 \ldots 0]^T$. Moreover, the predictor output signal-to-noise ratio level is given by Theorem 1

$$SNR_{predictor} = 1 + \alpha^2(N_t - 1).$$

Based on equation (16), Theorem 1, and the fact that $g_{t-1}$ is the first column of $H_{ouse}(g_{t-1})$, the predictor output is given by $\tilde{g}_t = g_{t-1}$, i.e., the predictor unit is simplified into a delay unit. It is very difficult to quantify the vector quantization processing gain in equation (14) analytically, However, its value can be simply lower bounded. The vector quantization processing gain in equation (14) is lower bounded as $G_{VQ} \geq 1$.

Combining the above results, we reach a signal-to-noise ratio lower bound for the open-loop predictive vector quantization system:

$$SNR = \frac{E_s}{\sigma^2} SNR_{predictor} G_{VQ} \geq \frac{E_s}{\sigma^2}(1 + \alpha^2(N_t - 1)) \quad (18)$$

The signal-to-noise ratio lower bound in equation (18) has several important implications. First, unlike the memory-less vector quantization beamforming scheme, the signal-to-noise ratio of the predictive vector quantization scheme is a function of the fading parameter $\alpha$. A larger $\alpha$, or equivalently, a slower fading speed, means higher system signal-to-noise ratio. This result also agrees with the common intuition that a good beamforming scheme should attain higher gain at slower fading environment.

Secondly, at slow fading speed, i.e. the $\alpha \to 1$ scenarios, the signal-to-noise ratio level from the predictive vector quantization system is much larger than the signal-to-noise ratio upper bound from the memory-less beamformers. In addition, most of the high signal-to-noise ratio is obtained from the linear predictor unit 32, which does not exist in the memory-less beamformers. This result closely resembles the other predictive vector quantization systems in the areas of voice and image coding, where the prediction unit provides significant amount of processing gains.

The predictive vector quantization beamforming scheme of the illustrated embodiment has taken advantage of the inter-frame correlation. So far, we have designed the optimal predictor unit using an open-loop design approach. The remaining problem is to design the codebook for the vector quantization unit 28 in FIG. 2b using a generalized Lloyd algorithm. To do this, we adopt a closed-loop vector quantization adaptive codebook algorithm. To clarify the presentation, the detailed Lloyd training algorithm for the closed-loop vector quantization codebook is summarized in Table I.

TABLE 1

CLOSED-LOOP PVQ TRAINING ALGORITHM

Step 1: Initialization:
Prepare random training sequence $\{h_t, t = 1, \ldots, T\}$; Generate initial codebook $C_1$ using the result from Section III-C; Define convergence threshold $\psi$. Set $D_1 = \infty$, k = 1.

Step 2: Feed the training sequence into the PVQ beamformer in FIG. 2. The residue signal $\bar{e}_t$ is quantized using the current codebook $C_k$, and the output from the VQ unit is given by
$\hat{v}_t = \arg\min_{\forall c_j \subseteq C_k} \bar{d}(\bar{e}_t, c_j)$,
where the residue signal is given by $\bar{e}_t \triangleq H_{ouse}{}^H(\hat{g}_{t-1})h_t$,
and the reconstructed channel direction (or beamforming weight) is $\hat{g}_t = H_{ouse}(\hat{g}_{t-1})\hat{v}_t$.

Calculate $D_k = \Sigma_{t=1}^T \bar{d}(\bar{e}_t, \hat{v}_t)$. If $\frac{D_{k-1} - D_k}{D_k} \leq \psi$, stop;

Otherwise goto Step 3.

Step 3: Calculate the centroid of each cluster of training signals that generate the same VQ index, i.e.,
$c_j^{new} = ev(R_j) = ev(\Sigma_{\forall \tilde{e}_t \in e_j} \tilde{e}_t{}^H \tilde{e}_t)$, for $j = 1, \ldots, 2^N$,
where $ev(\bullet)$ denotes a operator that returns the eigenvector that corresponds to the largest eigenvalue,
and $\Theta_j \triangleq \{\tilde{e}_t | \hat{v}_t = c_j, \forall t \leq T\}$.
Use $c_j^{new}$, $j = 1, \ldots, 2^N$ as the new entries in the new VQ codebook $C_{k+1}$.
Set $k = k + 1$ and go to Step 1.

In the closed-loop approach, the reconstructed channel direction $\hat{g}_{t-1}$, instead of the actual channel direction $g_{t-1}$, will be fed into the predictor unit 22, thus "closing the loop" as depicted in FIG. 2*b*. The closed-loop adaptive codebook algorithm is a modified Lloyd training algorithm. At the initialization stage, an optimal predictor from Theorem 1 has already been implemented based on the open-loop analysis and it will remain unchanged during the training process. In addition, an initial vector quantization codebook is also given at the beginning of the training. At the next step, the residue vectors from the residue generator unit 24 will be quantized based on equation (11) using the current codebook in the vector quantization unit 28. The residue vectors that belong to a particular codebook entry will be grouped into a cluster, i.e., $\tilde{e}_t \in \Theta_i$ if $i = \min_{c_j \in C} \bar{d}(\tilde{e}_t, c_j)$ where $\Theta_i$ denotes the collection of residue vectors that are quantized using the same codebook entry $c_i$. After all the residue vectors have been grouped into clusters, a new centroid is calculated for each cluster using a minimum distortion criterion. For example, the new centroid for the ith cluster is calculated as:

$$c_i^{new} = \arg\min_{\forall ||c||=1} \sum_{\forall \tilde{e}_t \in \Theta_i} \bar{d}(\tilde{e}_t, c) = \arg\min_{\forall ||c||=1} - \sum_{\forall \tilde{e}_t \in \Theta_i} |\tilde{e}_t^H c|^2. \quad (19)$$

Following the derivation in Xia, the solution to the problem in equation (19) is the eigenvector that corresponds to the largest eigenvalue of the matrix $R_i = \Sigma \forall \tilde{e}_t \in \Theta_i (\tilde{e}_t^H \tilde{e}_t)$. The group of new centroid $c^{new}{}_i$; $i=1; \ldots; 2^N$ will replace the old codebook entries. As a result, a new vector quantization codebook is generated. This whole training procedure is repeated until a convergence threshold is met.

Due to the introduction of the feedback loop, the closed-loop design approach is not guaranteed to be optimal. Since the reconstructed channel direction instead of the actual channel direction is fed into the predictor 22 in FIG. 2*b*, the predicting gain will be slightly lower than the open-loop case. In addition, the above modified Lloyd training algorithm is not guaranteed to reduce the quantization error monotonically at each step of the iteration. However, the predictive vector quantization predictor will provide a performance very close to the optimal if the reproduction is of sufficient high quality. Furthermore, the modified Lloyd training algorithm will almost always converge to a local optimal point in practice. For our predictive vector quantization beamforming scheme, we have used a relatively larger codebook size $2^N$, thus the near perfect reconstruction assumption is always satisfied in practice.

Below we will use numerical simulations to demonstrate that the above closed-loop algorithm is effective for normal MISO systems and substantial signal-to-noise ratio gain is achieved using the predictive vector quantization beamformer.

Successive Beamforming System

The predictive vector quantization beamformer described above attains very high receive signal-to-noise ratios. However, it has a few drawbacks. First, the optimal predictive vector quantization codebook needs to be constructed for each different fading parameter α, which is a prohibitive task for the system designers. Secondly, storing different codebooks for different values of a requires a large memory space, which is also a challenge for practical implementation.

Here, we disclose a novel successive beamforming scheme. This new successive beamforming algorithm significantly reduces the implementation complexity. In the mean time, it attains nearly the same signal-to-noise ratio performance as the predictive vector quantization beamformer. In certain scenarios, it even surpasses the original predictive vector quantization beamformer with better error performance. Note that we have used the notation "successive beamforming" to differentiate it from the memory-less beamforming or the predictive vector quantization beamforming.

In a successive beamforming system, the codebook is adjusted at each frame, i.e., the codebook $C_t = \{c_{it}; i=1; \ldots; 2^N\}$ is a function of time t. Whereas in the memory-less beamformer or the predictive vector quantization beamformer, the beamforming codebook remains fixed after being constructed. By adjusting the codebook based on the channel knowledge from the previous frame, the successive beamformer can benefit from channel correlation and achieve higher processing gain. In this section of the specification, our main focus is to develop a codebook adaptation scheme that can keep track of the channel in an efficient manner and realize a higher receive signal-to-noise ratio.

Successive Beamforming in Static Fading Cases

Before we design the successive beamforming system scheme for the AR1 fading channel, we consider a simple static fading case. In the static fading scenario, a complex Gaussian MISO channel is realized at the first frame, this Gaussian channel has zero-mean and simple covariance $cov(h_i; h_j) = \delta_{ij}$. Once the MISO channel is realized, it remains fixed for all the subsequent frames. Obviously, the memory-less beamformers in Lemma 1 can be used to generate the transmit weight for the first frame. At each subsequent frame, new feedback bits reach the transmitter 16. A successive refinement beamforming scheme can use these additional feedback bits to further enhance the signal-to-noise ratio performance. However, the memory-less beamformers in Lemma 1 cannot solve this successive refinement problem.

In what follows, we study the successive beamforming system problem in the static fading scenario. Through the analysis on this simple case, we obtain some useful knowledge on the signal-to-noise ratio performance as well as the convergence behavior of the successive beamformer. As illustrated in Lemma 1, after applying the memory-less beamformer to the first frame, the system signal-to-noise ratio is upper bounded by $$SNR \le \frac{E_s}{\sigma^2}\left(N_t - (N_t-1)2^{\frac{-N}{N_t-1}}\right).$$

The upper bound can be reached if and only if $$\Omega^{N_t} = \bigcup_{i=1}^{2^N} S_{c_i}(\beta), \tag{20}$$

where $c_i$; $i=1;\ldots 2^N$ denote the $2^N$ transmit weights in the memory-less beamformer codebook, $\beta=(2)^{-N/(N_t-1)}$ and $S_{c_i}(z) \triangleq \{g|d_c^2(c_i,g) \le z\}$ denotes a spherical cap centered around the direction $c_i$ with radius z. In other words, the surface of the unit hypersphere can be covered by $2^N$ equal sized non-overlapping spherical caps each having radius $\beta$. Usually, the signal-to-noise ratio upper bound in Lemma 1 cannot be met except for the trivial $N_t=2$ and $N=1$ case. However, it has been demonstrated that a good beamformer always accomplishes a performance very close to this upper bound. Generally, the bound in Lemma 1 is very tight and can be used to approximate the performance of the actual Grassmannian beamformers.

To simplify our derivation, we assume that this upper bound is always met at the end of the first frame. Under this assumption, the distribution of the channel direction conditioned on the first beamforming vector $w_1$ will be a uniform distribution on the spherical cap $S_{w_1}(\beta)$ i.e., at the second frame, the channel direction satisfies $g \sim U(S_{w_1}(\beta))$.

At the second frame, a successive beamforming system scheme should have a new codebook $C_2=\{c_{i2}; 1 \le i \le 2^N\}$) Using this new codebook, a higher signal-to-noise ratio performance can be realized. We address the beamforming problem on the surface area of a spherical cap instead of the surface of the whole unit hypersphere. Lemma 3 is stated as follows. In a static fading scenario, assume a good successive beamformer with codebook $C_2=\{c_{i2}; 1 \le i \le 2^N\}$, then the average signal-to-noise ratio level at the second frame is approximated by:

$$SNR_2 \approx \frac{E_s}{\sigma^2}(N_t - \beta_2(N_t-1)), \tag{21}$$

where $\beta_2 \triangleq \beta(\frac{1}{2}^N)^{1/(N_t-1)}$.

The above derivation can be repeated for the consecutive frames and leads to the following result, which is referenced as Corollary 1. In a static fading scenario, assume that due to the beamforming effect from the (t−1)th frame, the conditional distribution of the channel direction satisfies $g \sim U(S_{w_{t-1}}(\beta_{t-1}))$, then the average signal-to-noise ratio level at the tth frame from a good successive beamformer with codebook $C_2=\{c_{it}; 1 \le i \le 2^N\}$ can be approximated as:

$$SNR_2 \approx \frac{E_s}{\sigma^2}(N_t - \beta_2(N_t-1)), \tag{22}$$

where $\beta_2 \triangleq \beta(\frac{1}{2}^N)^{1/(N_t-1)}$.

The result in Corollary 1 provides a tight upper bound on the achievable system signal-to-noise ratio of a successive beamformer. In what follows, we will use this result to quantify the processing gain of an ideal successive beamformer.

Steady-State Performance of a Successive Beamformer

In this section, we analyze the steady-state performance of an ideal successive beamformer using the AR1 fading model in K. Mukkavilli, et. al. "On beamforming with finite rate feedback in multiple-antenna systems," *IEEE Trans. Inform. Theory*, vol. 49, no. 10, pp. 2562-2579, October 2003. The main goal of this analysis is to find a proper design criterion for the successive beamforming in the time-varying channel.

In a constantly changing environment, accurate modeling of the beamformer behavior is very difficult. Therefore, we focus on the steady-state performance. To simplify the derivation, we make the approximation that before the current frame, the MISO channel has experienced several frames of static fading, and an ideal successive beamformer from above has been applied for these frames. As a result of the successive beamforming system from the previous frame, the current channel direction $g_t$ is uniformly distributed on a small spherical cap $S_{w_{t-i}}(\beta_{steady})$, i.e. $g_t \sim U(S_{w_{t-i}}(\beta_{steady}))$. The conditional channel amplitude follows the distribution in Xia. In addition, the channel direction $g_t$ is still independent of the channel amplitude $\rho_t$. As we have observed in the numerical simulations, these approximations are quite close to the actual AR1 fading case. This is because for both the AR1 and static fading models, the successive beamformer tracks the channel very closely. In the steady state, the actual channel direction is usually concentrated in a small region around the previous beamforming weight $w_{t-1}$. Therefore, the conditional distribution of the channel direction is well approximated by a uniform distribution on a small spherical cap.

Based on the above assumptions and following the derivation in Lemma 3 and Corollary 1, we can calculate the steady state signal-to-noise ratio at the beginning of the tth frame as:

$$SNR_t \approx \frac{E_s}{\sigma^2}(N_t - \beta_{steady}(N_t-1)) \tag{23}$$

To determine the parameter $\beta_{steady}$, we use a two-step approach. In the first step, an ideal successive beamformer from above is employed. The successive beamformer generates the transmit weight $w_t$ and it enhances the signal-to-noise ratio level in equation (23) to a higher level. At the second step, the channel changes to the t+1th frame according to equation (2) regardless of the new beamforming weight $w_t$. For the two-step approach, the signal-to-noise ratio adaptation can be modeled as $$SNR_{t+1} = G_{chan}G_{bf}SNR_t, \tag{24}$$

where $G_{bf}$ represents the signal-to-noise ratio gain from successive beamforming system in the first step, and $G_{chan}$ represents the signal-to-noise ratio degradation due to channel variation in the second step. Based on Corollary 1, the beamforming gain in the first step is approximated as $$G_{bf} \approx \frac{N_t - \tilde{\beta}_{steady}(N_t-1)}{N_t - \beta_{steady}(N_t-1)}, \tag{25}$$

where $\tilde{\beta}_{steady} = \beta_{steady}(\frac{1}{2}^N)^{1/(N_t-1)}$. We then calculate the parameter $G_{chan}$. At the second step, the channel adapts to the next frame according to equation (2), and the average signal-to-noise ratio level at the beginning of the t+1th frame can be calculated as $$SNR_{t+1} = \frac{E_s}{\sigma^2} E(|h_{t+1}^H w_t|^2) \quad (26)$$
$$= \frac{E_s}{\sigma^2}(\alpha^2 E(|h_t^H w_t|^2) + (1-\alpha^2) w_t^H E(x_{t+1} x_{t+1}^H) w_t)$$
$$= \alpha^2 G_{bf} SNR_t + \frac{E_s}{\sigma^2}(1-\alpha^2),$$

where the second equality is due to equation (2) and the fact that $x_{t+1}$ is zero-mean Gaussian and independent of $h_t$; the third equality is due to the fact that $E(x_{t+1} x^H_{t+1}) = I_{Nt}$. The results in equations (26) and (24) imply $$G_{chan} = \alpha^2 + \frac{E_s(1-\alpha^2)}{\sigma^2 G_{bf} SNR_t}. \quad (27)$$

At the steady state, the signal-to-noise ratio level stays constant, i.e. $G_{bf} G_{chan} = 1$. Combining equations (23), (25), and (27), we obtain $$\beta_{steady} = \frac{1-\alpha^2}{1 - \frac{\alpha^2}{(1/2^N)^{\frac{1}{N_t-1}}}}, \quad (28)$$

and $$SNR_{steady} = \frac{E_s}{\sigma^2}\left(N_t - \frac{(1-\alpha^2)(N_t-1)}{1 - \frac{\alpha^2}{(1/2^N)^{\frac{1}{N_t-1}}}}\right). \quad (29)$$

Codebook Construction for Successive Beamformer

So far, we have established the steady-state performance of a successive beamformer in the AR1 fading environment. In the next, we will discuss how to construct a series of codebooks that can realize such a signal-to-noise ratio performance. As outlined in above, the primary goal of the successive adaptive codebook is to achieve the first-step processing gain in equation (25). In Lemma 3 and Corollary 1, we have shown the processing gain from an ideal adaptive codebook. Straightforwardly, a good design approach is to minimize the performance difference between a practical codebook and an ideal codebook.

Towards this end, we introduce an important concept as follows. The conforming radius $z_0$ of a codebook $C_t$ is defined as the largest value of z such that the relations $S_{c_{it}}(z) \cap S_{c_{jt}}(z) = \emptyset$ and $S_{c_{it}}(z) \subset S_{w_{t-1}}(\beta_{steady})$ are satisfied simultaneously for and $\forall i \neq j$ and $i; j=1; \ldots; 2^N$.

The above conforming radius is similar to the overlap radius defined in the prior art. For a practical codebook, its signal-to-noise ratio performance is closely related to the value of its conforming radius. In particular, we have the following result which is called, Lemma 4. For any codebook $C_t$, it holds that $F_z(z) = \tilde{F}_z(z)$ when $z \leq z_0$, and $F_z(z) \leq \tilde{F}_z(z)$ when $z > z_0$, where $z \triangleq \min_{\forall i} d_c^2(c_{it}, g_t)$, and $F_z(z)$, $\tilde{F}_z(z)$ denote the cumulative distribution functions of z for the practical and ideal codebooks, respectively.

As shown in the proof of Lemma 3 and Lemma 4, the performance gap between an ideal beamformer and a practical beamformer is caused by the difference between the two cumulative distribution functions $F_z(z)$ and $\tilde{F}_z(z)$. When $z \geq z_0$, $F_z(z) < \tilde{F}_z(z)$. and thus there will be a performance gap between the two codebooks. Clearly, a good successive codebook can be obtained by maximizing its conforming radius as much as possible so that the difference between $F_z(z)$ and $\tilde{F}_z(z)$ can be minimized. As a result, the performance gap between ideal codebook and practical codebook will also be minimized.

Based on these arguments, we propose the following design criterion. which we call Proposition 1. The design criterion for a good successive beamforming system codebook is given by $$C_t = \arg\max_{\forall C_t} z_0. \quad (30)$$

Similar to the Grassmannian design criterion in Lemma 1, the design criterion in equation (30) is also an optimization problem. Usually, analytical solutions of these optimization problems are difficult to get. In many cases, researchers have developed unique structures that provide sub-optimal solutions for the beamformer design problems. Unfortunately, the design criterion in equation (30) is quite different from the maximum chordal distance design criterion in Lemma 1. The same structural design approaches in the prior art are not applicable for the optimization problem in equation (30).

In addition, using numerical methods to solve the optimization problem in equation (30) for each fading parameter $\alpha$ is also a difficult task. Similar to the predictive vector quantization beamformer, it also requires a large amount of storage space. In practical implementation, it is highly desirable to reduce the number of codebooks for easy storage.

Another critical concern with the successive beamforming system is that the codebooks must be updated synchronically at both the transmitter 16 and receiver 18 at each frame. If the codebooks on the two sides are mismatched, serious decoding errors will occur.

Overall, in the case of the successive beamforming systems, there are several highly desirable features for practical implementation. These features include a low complexity construction algorithm, small storage requirement, and synchronized adaptation at both the transmitter 16 and receiver 18. In what follows, we introduce a novel systematic codebook generation strategy. The proposed scheme will produce a series of codebooks as a suboptimal solution for the problem in equation (30). Moreover, this scheme possesses all the above desirable features, thus it is very promising for practical implementation.

We define Proposition 2 as follows. At the tth frame, the successive beamforming system codebook is generated as:

$$C_t = \{c_{it} = H_{ouse}(w_{t-1})[\eta e_1 + \sqrt{1-\eta^2} \hat{f}_i], 1 \leq i \leq 2^N\} \quad (31)$$

where $\hat{f}_i = [0 \; \hat{f}_i^T]^T$, $i=1, \ldots, 2^N$ are $N_t \times 1$ column vectors, $\hat{f}_i \triangleq [f_{i1} \ldots f_{i(N_t-1)}]^T$ $i=1, \ldots, 2^N$ are constant $(N_t-1) \times 1$ column vectors with unit norm. The term $\eta$ is a scalar parameter and its value is given by $$\eta = \sqrt{1 - \frac{\beta_{steady}}{\left(1 + \sqrt{\frac{1-\xi_{max}}{2}}\right)^2}}, \quad (32)$$

and $\xi_{max} \triangleq \max_{\forall i,j} \text{Re}(\hat{f}_i^H \hat{f}_j)$.

In what follows, we show that the codebook generation strategy in equation (31) provides all the aforementioned desirable properties. These features justify the design approach in Proposition 2.

Universal Codebook for all Fading Scenarios:

As demonstrated in equation (31), only a single codebook $\hat{F} = \{\hat{f}_i, i=1, \ldots, 2^N\}$ is required for the successive beamforming procedure. This codebook consists of $2^N$ constant unit norm column vectors. Unlike the predictive vector quantization beamformer, the present embodiment requires very little storage space. In a practical implementation, the codebook $\hat{F}$ is designed offline and stored at both the transmitter 16 and receiver 18. For a different fading parameter $\alpha$, the codebook $C_t$ can be simply derived by adjusting the scalar parameter $\eta$. Note that the parameter $\eta$ is a function of $\beta_{steady}$, which in turn is uniquely determined by the fading parameter $\alpha$ through equation (28).

2) Synchronization without Extra Feedback:

The codebook adaptation procedure in equation (31) is uniquely defined at both the transmitter 16 and the receiver 18. This is because at the tth frame, both the transmitter 16 and receiver 18 know the transmit weight $w_{t-1}$ from the previous frame. The householder matrix $H_{ouse}(w_{t-1})$ is also uniquely defined. Thus both the transmitter 16 and receiver 18 can update $H_{ouse}(w_{t-1})$ simultaneously. In addition, the parameter $\eta$ is determined through negotiation between the transmitter 16 and receiver 18, and the same universal codebook $\hat{F}$ is known on both sides. Based on the structure in equation (31), both sides 16 and 18 of the wireless link can update their beamforming codebooks $C_t$ simultaneously without any extra feedback.

3) Simple Codebook Construction on Universal Codebook $\hat{F}$:

To derive the optimal universal codebook $\hat{F}$, we first note an important result regarding the conforming radius of the successive codebook $C_t$. It is designated as Theorem 2. In a slow fading environment, if the codebook is designed according to the strategy in equation (31), then the conforming radius of $C_t$ is given by $$z_0 = \frac{\beta_{steady}(1 - \xi_{max})}{2\left(1 + \sqrt{\frac{1-\xi_{max}}{2}}\right)^2}. \tag{33}$$

Based on definition, the feasible range of $\xi_{max}$ is $\xi_{max} \in [-1, 1]$. In addition, it can be easily verified that $z_0$ is a monotonically decreasing function of $\xi_{max}$. Combining these results and Proposition 1, we obtain the design criterion for the universal codebook $\hat{F}$:

$$\hat{F} = \operatorname*{argmin}_{\forall \hat{F}} \xi_{max} = \operatorname*{argmin}_{\forall \hat{F}} \max_{1 \leq i,j \leq N} Re(\hat{f}_i^H \hat{f}_j). \tag{34}$$

The simple design criterion in equation (34) suggests that the codebook $\hat{F}$ is independent of the fading parameter $\alpha$. This feature is very convenient for a practical implementation. The codebook $\hat{F}$ can be constructed offline regardless of the actual fading. Once in the operational mode, the actual codebook $C_t$ can be easily derived based on equation (31). The optimization problem in equation (34) can be solved using standard numerical methods. In this embodiment, we generate the universal codebook $\hat{F}$ using the fminmax( ) function in the optimization toolbox of MATLAB.

In the above disclosure, we have established a method of designing a successive beamformer, along with its primary implementation advantages. The proposed successive beamforming system is based on a slow fading assumption. However, as demonstrated below, the codebook constructed based on equation (34) yields superior performance at both high and low fading speeds.

Numerical Simulations and Implementation Issues

To illustrate the performance of the illustrated beamforming embodiments, we present Monte Carlo simulations for several different MISO systems. In these simulations, we assume that the wireless system is operating at a carrier frequency equal to 2 GHz. In addition, a feedback channel with 4500 bps bandwidth has been adopted. For a codebook with $2^N$ entries, the feedback interval is N=4500 second. In the bit error rate (BER) simulations, we use the biphase shift keying (BPSK) constellation which transmits at rate 1 bit/s/Hz. In these simulations, we assume that the feedback channel is error free, and there is one frame feedback delay between the transmitter 16 and receiver 18. For fair comparison, all the beamforming schemes have equal transmit power. It is to be understood that each of these parameters could be varied according to the illustration used and none should be regarded as a limitation of the scope of the invention.

Figure 3:
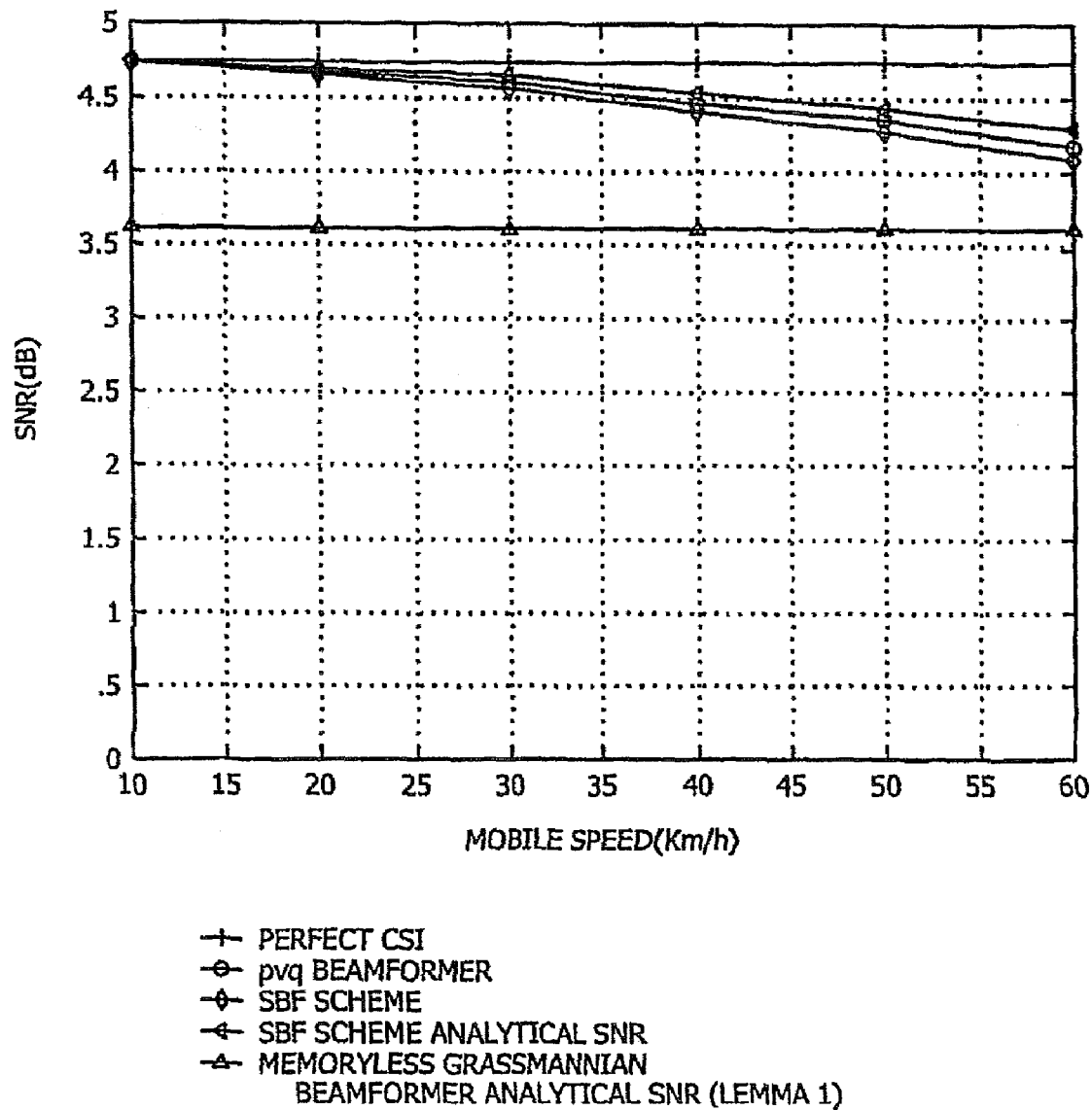
FIG. 3 is a graph comparing the signal-to-noise ratios for a plurality of beamforming embodiments as a function of mobile speed for a time varying fading channel in a numerical simulation of the invention where the number of transmit antennas $N_t=3$ and the number of feedback bits, $N=3$.
Figure 4:
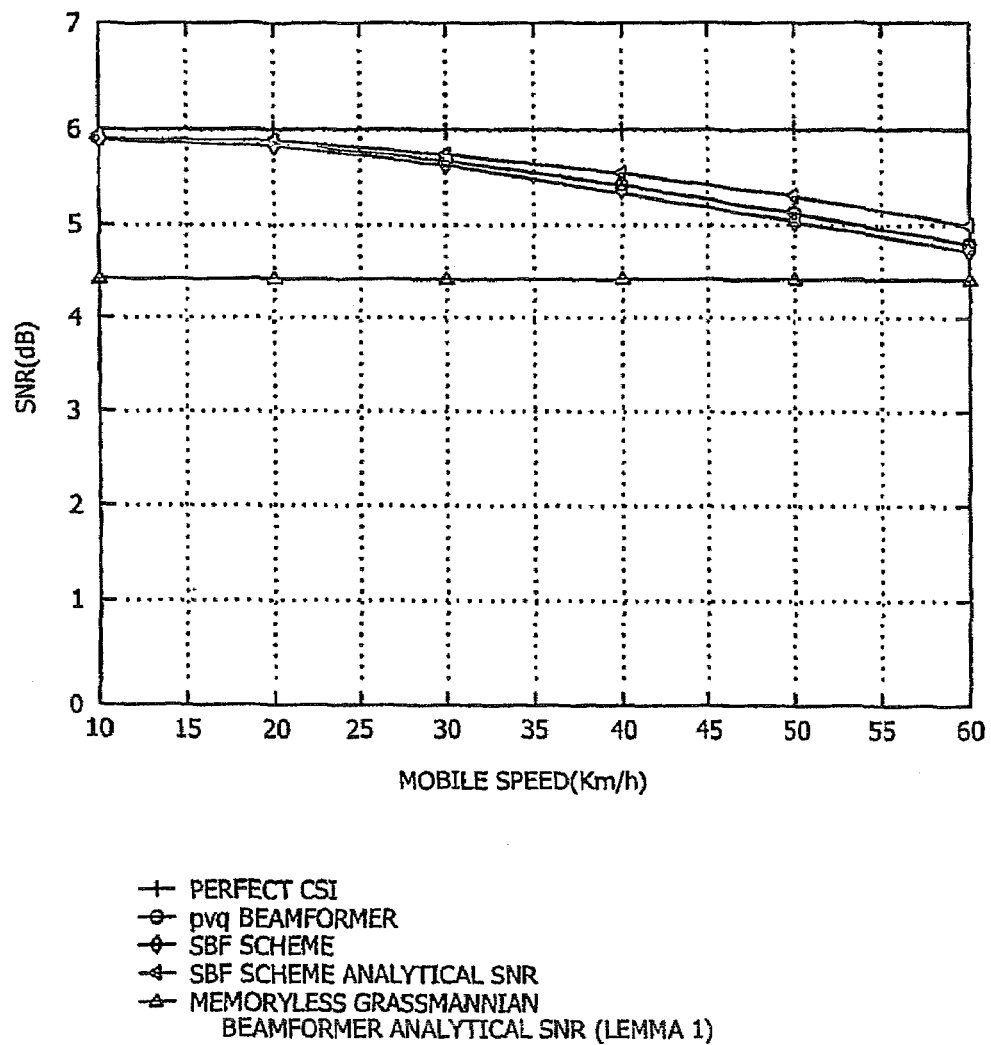
FIG. 4 is a graph comparing the signal-to-noise ratios for a plurality of beamforming embodiments as a function of mobile speed for a time varying fading channel in a numerical simulation of the invention where the number of transmit antennas $N_t=4$ and the number of feedback bits, $N=4$.

Comparing on Average Receive Signal-to-Noise Ratio:

We have implemented both the predictive vector quantization and the successive beamforming embodiments disclosed above. For each embodiment, we assume $E_s/\sigma^2=1$ and then use Monte Carlo simulations to examine the actual receive signal-to-noise ratio for various fading parameters $\alpha$. We also calculate the theoretical steady-state signal-to-noise ratio value using equation (29). The results are summarized in the graph of FIG. 3 where the signal-to-noise ration is graphed against mobile speed for a system with $N_t=3$; N=8, and in the graph of FIG. 4 for a system with $N_t=4$; N=16. The theoretical signal-to-noise ratio upper bound for the memory-less Grassmannian beamformer (MGB) in Lemma 1 is also included in both graphs of FIGS. 3 and 4.

As can be seen from the graphed results, the predictive vector quantization (PVQ) embodiment accomplishes the best signal-to-noise ratio level among the different beamforming embodiments. This result agrees with the common observation that codebooks designed using Lloyd algorithm normally generate very good signal-to-noise ratio performance. The signal-to-noise ratio performance of the successive beamforming system (SBF) embodiment comes very close to that of the predictive vector quantization embodiment. In most cases, the difference is within 0.1 dB. This result confirms that the successive beamforming embodiment, though not necessarily optimal, can deliver an average signal-to-noise ratio nearly as good as the numerical vector quantization beamforming embodiment, and this high signal-to-noise ratio performance is obtained using a much simpler implementation.

In addition, the theoretical steady-state signal-to-noise ratio in equation (29) and the actual signal-to-noise ratios from the successive beamforming embodiments are very close. Their difference is especially small at low mobile speeds within 0.1 dB for speed $\leq 30$ km/h. For fast fading cases, the discrepancy increases slightly. This increasing difference could be due to the fact that our successive beamforming embodiment is designed based on a low fading speed assumption.

In general, the analytical signal-to-noise ratio in equation (29) closely predicts the actual signal-to-noise ratio performance of the successive beamforming embodiment. Finally, both the predictive vector quantization and successive beamforming embodiments outperform the memoryless Grassmannian beamformer (MGB) embodiment. At slow fading scenario, more than 1.3 dB signal-to-noise ratio gain is observed.

Figure 5:
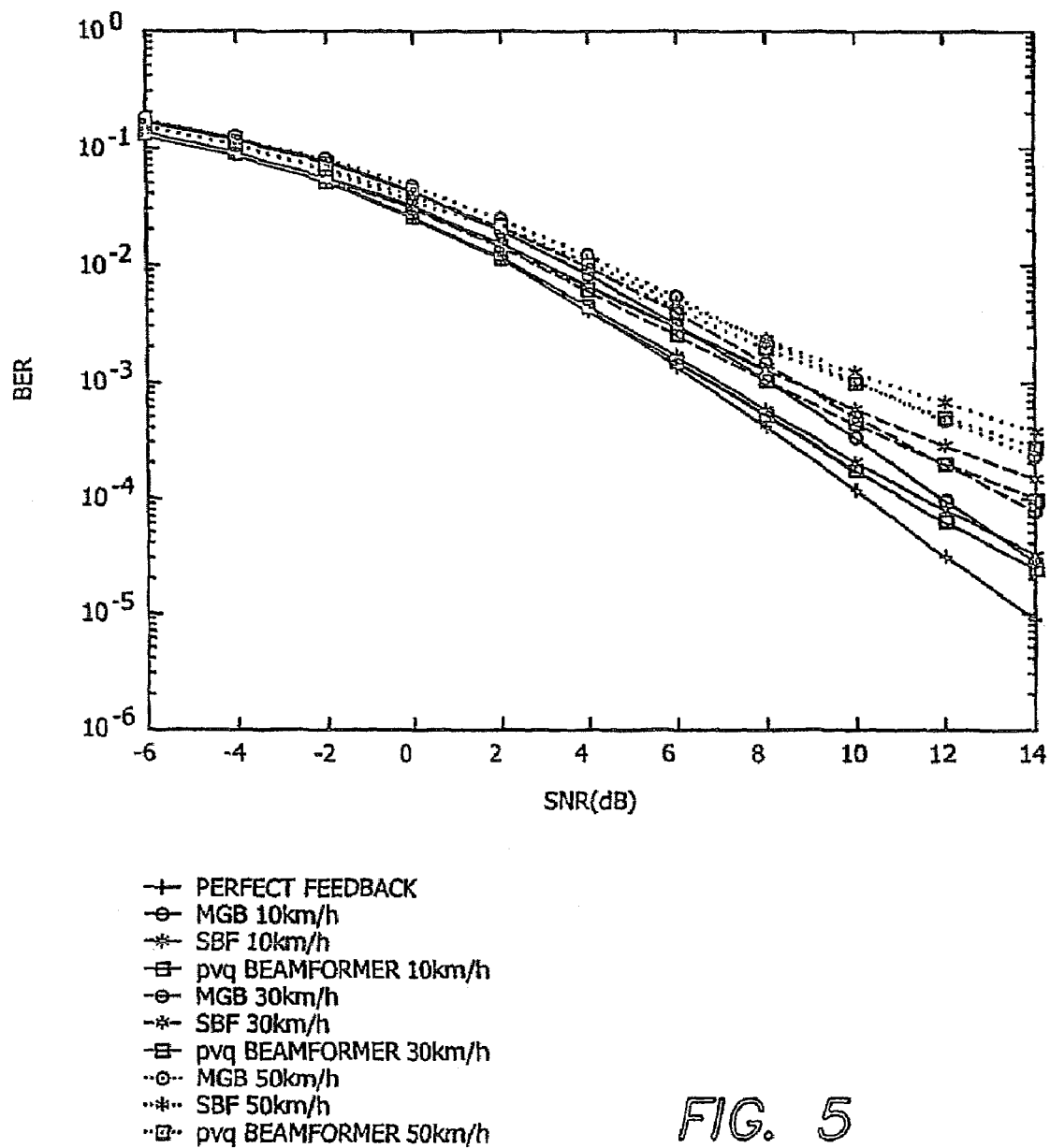
FIG. 5 is a graph comparing the bit error ratios (BER) for a plurality of beamforming embodiments and mobile speeds as a function of SNR for a time varying fading channel in a numerical simulation of the invention where the number of transmit antennas $N_t=3$ and the number of feedback bits, $N=3$.
Figure 6:
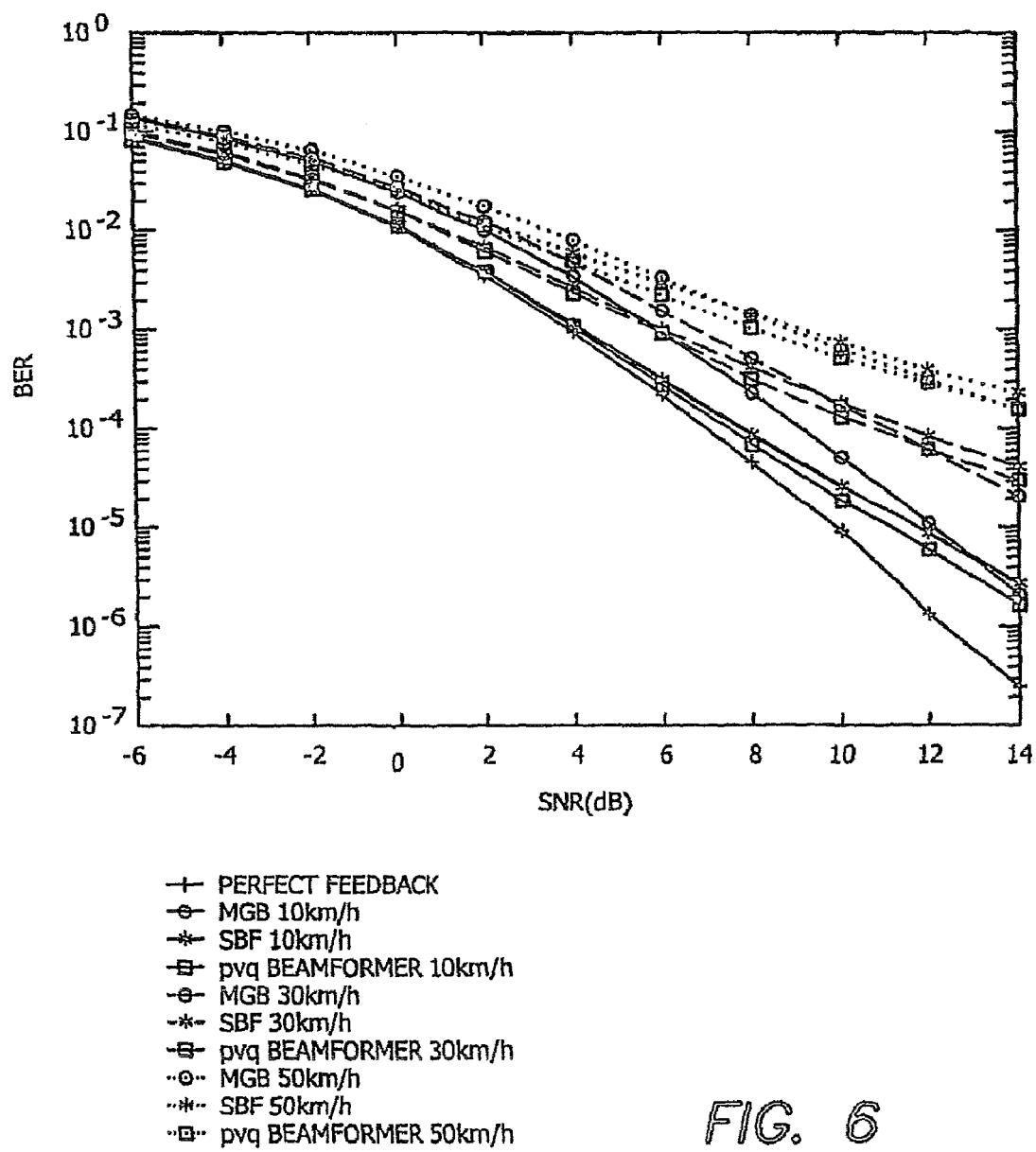
FIG. 6 is a graph comparing the bit error ratios (BER) for a plurality of beamforming embodiments and mobile speeds as a function of SNR for a time varying fading channel in a numerical simulation of the invention where the number of transmit antennas $N_t=4$ and the number of feedback bits, $N=4$.

Bit Error Rate (BER) Performance:

We now examine the BER performance for four different transmit beamforming embodiments: the MGB embodiment, the predictive vector quantization embodiment, the successive beamforming system, and an ideal beamformer which uses perfect channel knowledge at the transmitter 16. The BER-signal-to-noise ratio curves for $N_t=3$; $N=3$ case and $N_t=4$; $N=4$ cases are depicted in the graphs of FIGS. 5 and 6, respectively. As can be seen from these figures, the ideal beamformer with perfect channel state information provides an BER lower bound for all the other embodiments. For the beamformers with finite rate feedback, the predictive vector quantization beamformer provides the best performance at low signal-to-noise ratios. The successive beamforming embodiment attains nearly the same performance as that of the predictive vector quantization beamformer. Both are better than the MGB embodiment. However, most of the performance improvement is obtained at the low signal-to-noise ratio range. At the high signal-to-noise ratio range, the performance gain from the predictive vector quantization and successive beamforming system embodiments diminishes. In certain scenarios, it is even inferior to the MGB embodiment.

This result is actually not surprising. In this specification, we have focused on a beamforming embodiment that can maximize the average receive power. However, it has been pointed out in the art that the maximum receive power design criterion is only valid for the low signal-to-noise ratio environment. At high signal-to-noise ratios, most of the symbol errors are caused by the few scenarios where the channel is in deep fading. For the AR1 model in equation (2), if the channel is in deep fading, a small adjustment term $\bar{\alpha}x_t$ will result in a large variation in the channel direction $g_t$. For a successive beamformer, its performance at high signal-to-noise ratio will be determined by its ability to track the channel effectively in deep fading. A coarse but fast tracking of the channel is much more effective than a fine but slow tracking channel. The maximization of the average receive signal-to-noise ratio, on the other hand, will usually result in a fine but slow tracking performance.

To enhance the tracking performance of the successive beamforming system embodiment at high signal-to-noise ratios, we can simply adjust the parameter $\eta$ in equation (31). As implied above, the tracking performance of the successive beamforming system algorithm is determined by the parameter $\eta$, which is in turn determined by the value of $\beta_{steady}$. When the channel is in deep fading, the conditional channel direction will be distributed on a larger spherical cap $S_{w_{t-1}}(\beta_{steady})$ For the embodiment in equation (31), the codebook can cover a larger spherical cap by simply using a smaller $\eta$. For a fast and coarse tracking, a straightforward approach is to use a smaller $\eta$ at high signal-to-noise ratio range. At the extreme case, if $\eta=0$, the design criterion in Proposition 1 will be reduced to the Grassmannian beamformer design criterion in Lemma 1.

To determine the optimal value of $\eta$, we use a numerical approach. The BER simulations were performed for $1-\eta$ in steps of one-quarter of a decade, i.e., in a factor of 1.778 apart. At different signal-to-noise ratio levels, the optimal value for $\eta$ is obtained through extensive BER simulations. Such a numerical approach has also been investigated for the GFB algorithms in the prior art and significant performance improvement has been obtained. In a practical implementation, the optimal values of $\eta$ are stored in a lookup table. Based on the current signal-to-noise ratio and fading speed, the optimal $\eta$ is calculated at the receiver 18 and sent back to the transmitter 16. As demonstrated in the subsequent simulations, a coarse quantization on $\eta$ will result in significant performance improvement. In addition, since the fading parameter $\alpha$ is a relatively slowly changing parameter, the feedback of this parameter incurs very little feedback overhead.

Enhanced BER Performance:

The BER as a function of $\eta$ is investigated through numerical search for different mobile speeds. The results are summarized in the graph of FIGS. 7 and 8 for $N_t=3$ and $N_t=4$ cases, respectively. Both figures confirm that the analytical value of $\eta$ in equation (32) is only accurate at low signal-to-noise ratios, and a smaller $\eta$ will result in better BER performance at high signal-to-noise ratios.

Figure 7:
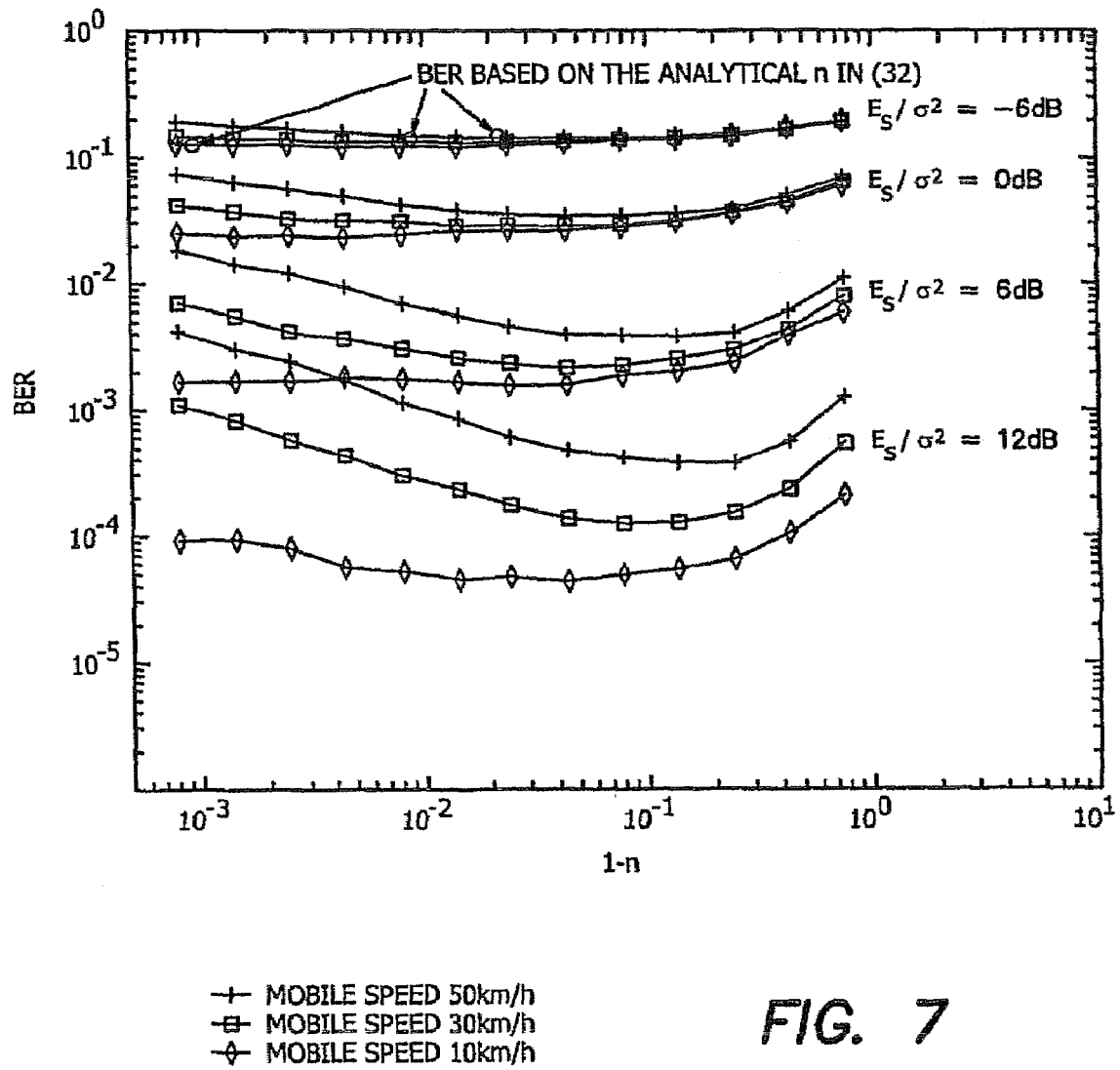
FIG. 7 is a graph comparing the bit error ratios (BER) for a plurality of mobile speeds as a function of the parameters $E_s/\sigma^2$ and $1-\eta$ for a time varying fading channel in a numerical simulation of the invention where the number of transmit antennas $N_t=3$ and the number of feedback bits, $N=3$.
Figure 8:
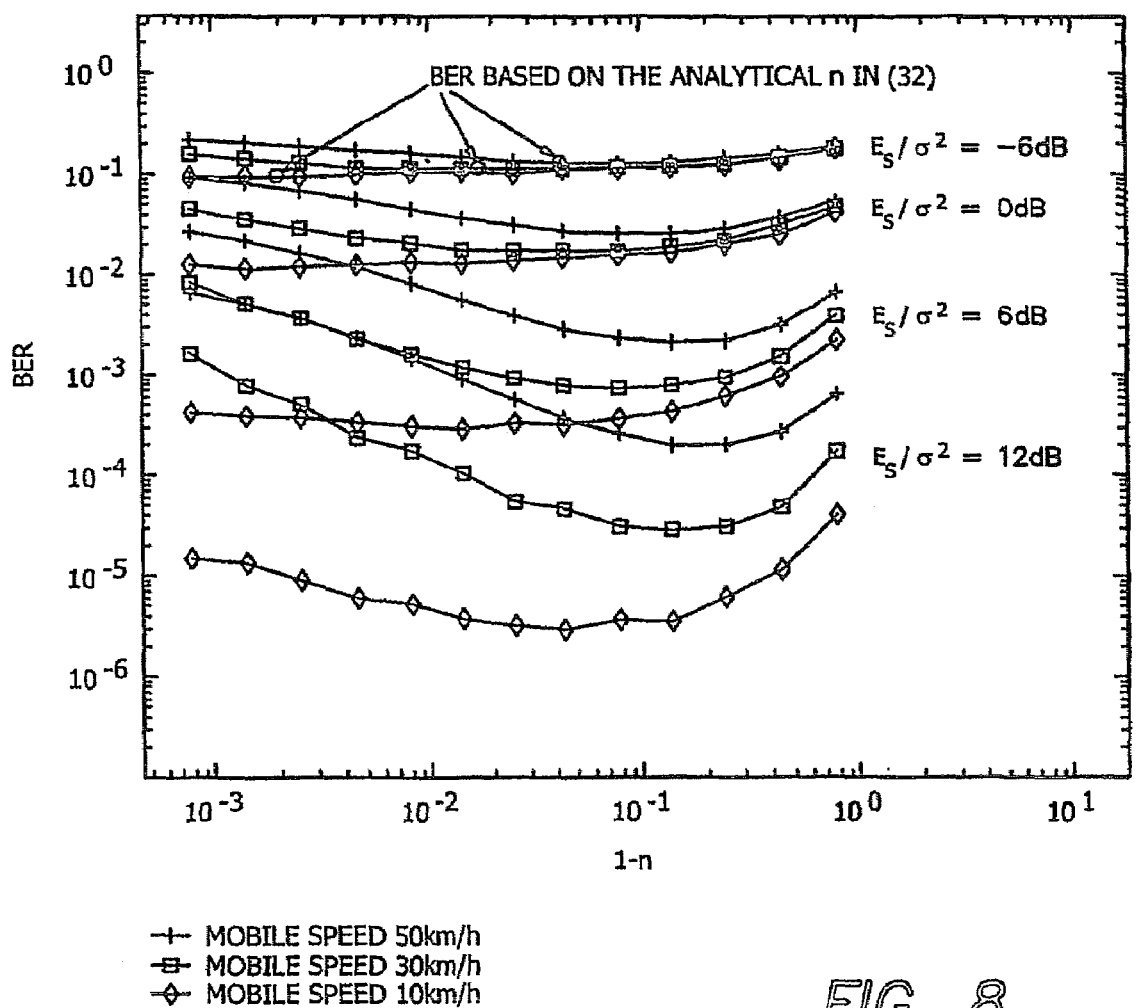
FIG. 8 is a graph comparing the bit error ratios (BER) for a plurality of mobile speeds as a function of the parameters $E_s/\sigma^2$ and $1-\eta$ for a time varying fading channel in a numerical simulation of the invention where the number of transmit antennas $N_t=4$ and the number of feedback bits, $N=4$.

Based on the results in the graphs of FIGS. 7 and 8, we define a very simple adaptive feedback embodiment. Only two discrete values are allowed to be used for the parameter $\eta$ for the codebook generation embodiment in equation (31), namely $\eta_{high}=0.9769$ for low signal-to-noise ratio scenarios and $\eta_{low}=0.8702$ for high signal-to-noise ratio scenarios. These two values correspond to the two vertical lines on the numerical sweep results in FIG. 7 and FIG. 8. Note that the selection of $\eta_{high}$ or $\eta_{low}$ is not unique. These two heuristic values are chosen here because they yield fairly good BER performance. In addition, the receiver 18 also maintains a lookup table which stores a series of signal-to-noise ratio threshold values $\tau(v_{mb})$. The values of $\tau(v_{mb})$ are summarized in Table II for different mobile speed and different system settings.

TABLE II

SNR THRESHOLDS FOR THE QUANTIZATION OF $\eta$

| Mobile Speed | SNR Threshold (dB) |
|---|---|
| $N_t = 3$, N = 3 case | |
| 10 km/h | 14 |
| 30 km/h | 8 |
| 50 km/h | −2 |
| $N_t = 4$, N = 4 case | |
| 10 km/h | 12 |
| 30 km/h | 3 |
| 50 km/h | −6 |

When SNR ≥ Threshold, $\eta = \eta_{low} = 0.8702$
When SNR < Threshold, $\eta = \eta_{high} = 0.9769$ At mobile speed $v_{mb}$, if SNR<$\tau(v_{mb})$, $\eta_{high}$ will be utilized to generate the beamforming codebook in equation (31). Otherwise, $\eta_{low}$ will be selected. In a practical implementation, the receiver 18 monitors the signal-to-noise ratio and fading speed in real time. Once the fading environment changes significantly, one bit of feedback on the selection of $\eta$ will be sent back to the transmitter 16. As outlined from the above discussion, the proposed adaptive embodiment incurs very little system overhead.

Figure 9:
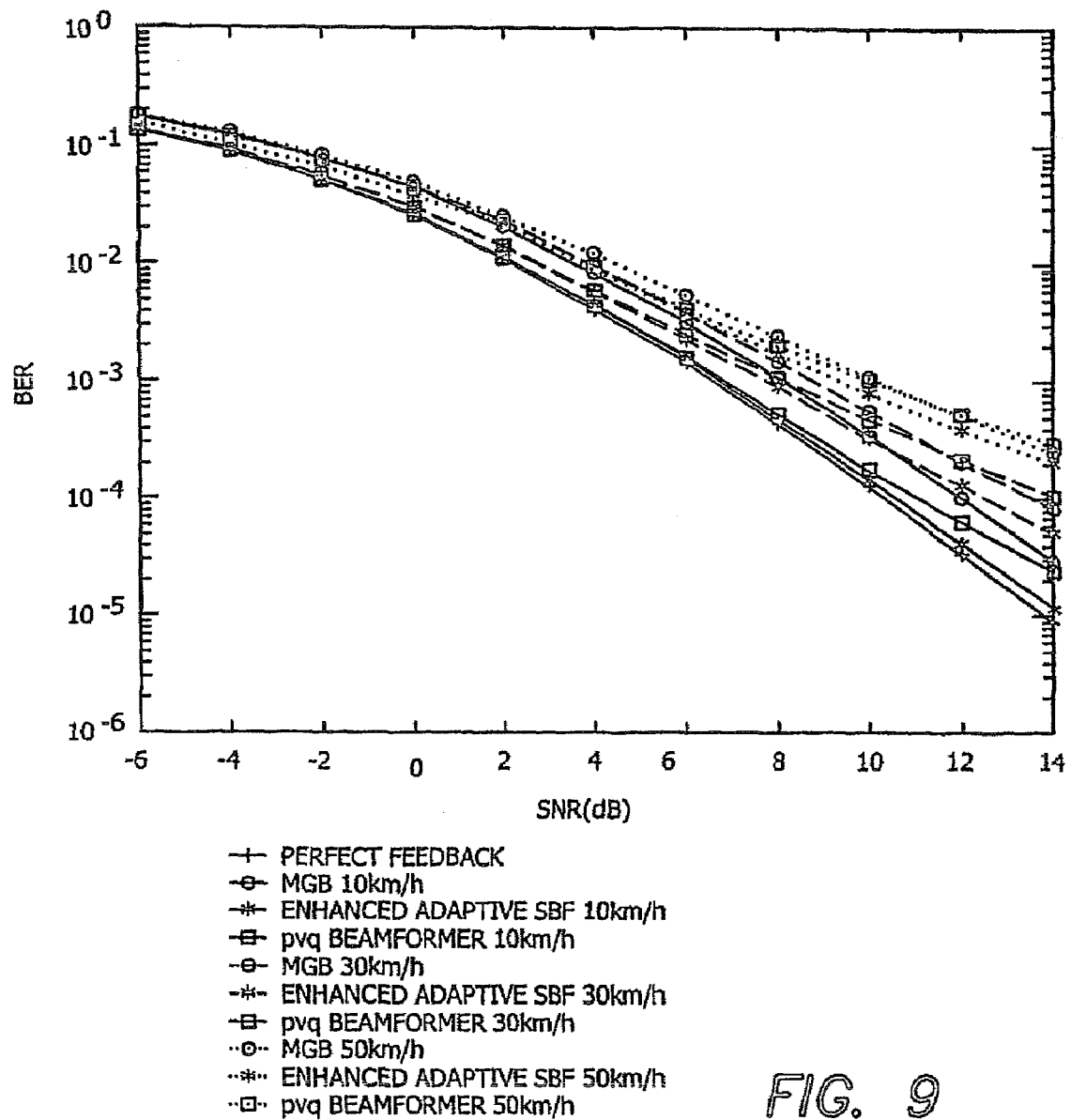
FIG. 9 is a graph comparing the bit error ratios (BER) of the enhanced adaptive SBF scheme for an AR1 channel for a plurality of mobile speeds as a function of SNR for a time varying fading channel in a numerical simulation of the invention where the number of transmit antennas $N_t=3$ and the number of feedback bits, $N=3$. The value of the parameter $\eta$ is determined using Table II.
Figure 10:
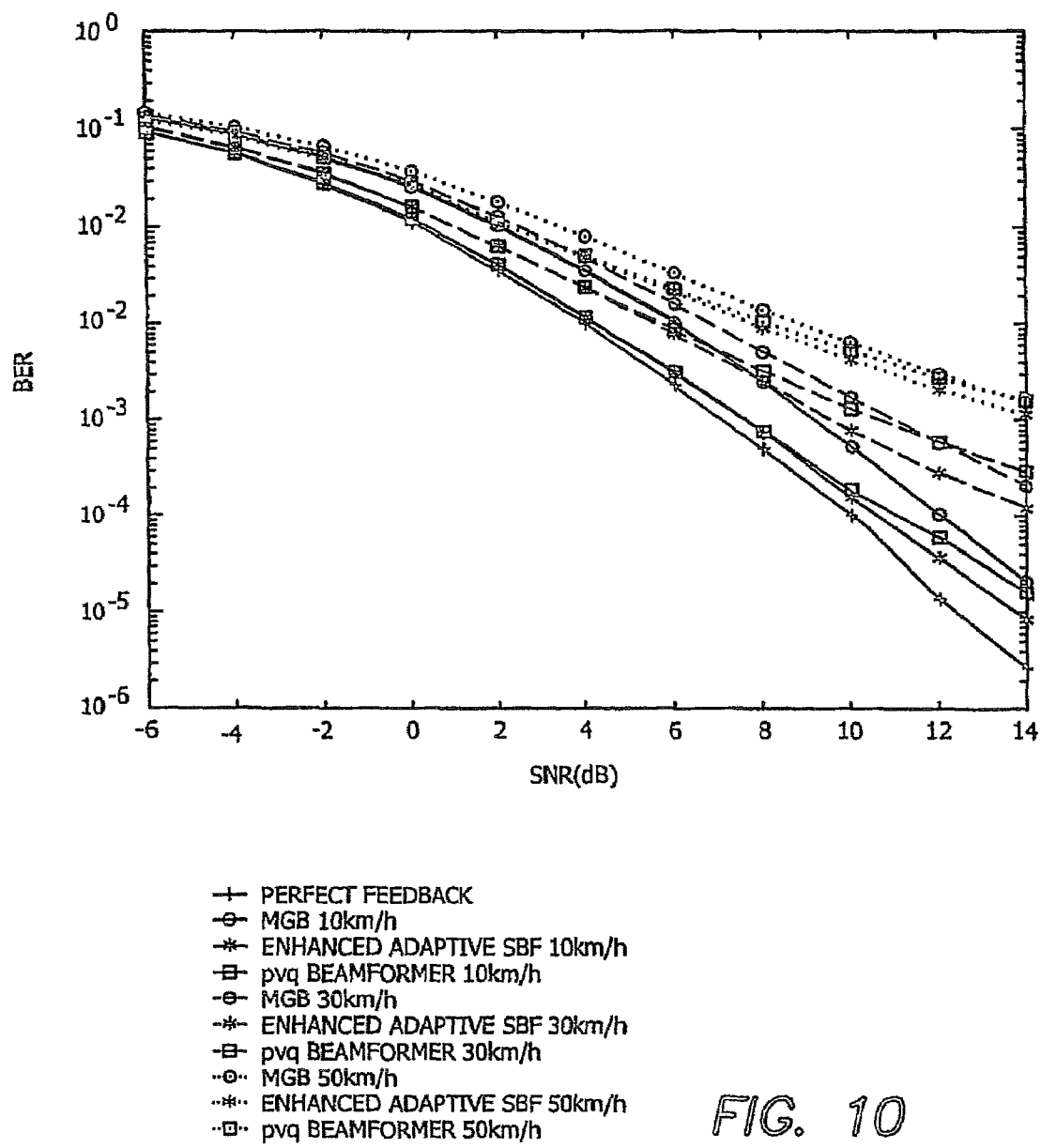
FIG. 10 is a graph comparing the bit error ratios (BER) of the enhanced adaptive SBF scheme for an AR1 channel for a plurality of mobile speeds as a function of SNR for a time varying fading channel in a numerical simulation of the invention where the number of transmit antennas $N_t=4$ and the number of feedback bits, $N=4$. The value of the parameter $\eta$ is determined using Table II.

The BER curves for the adaptive successive beamforming embodiment is depicted in FIGS. 9 and 10 for the $N_t=3$; $N=3$ and $N_t=4$; $N=4$ cases, respectively. Both embodiments show significant improvement on the BER performance compared to the original successive beamforming embodiment in FIGS. 5 and 6. Actually, by using the $\eta$ value in Table II, the tracking performance of the adaptive successive beamforming algorithm is now even better than the original predictive vector quantization beamformer. As a result, the adaptive successive beamforming algorithm outperforms the MGB embodiment as well as the predictive vector quantization embodiment at high signal-to-noise ratios.

Comparison with Stochastic Gradient Adaptation Algorithm:

Besides the disclosed successive beamforming embodiment, another important adaptive beamforming embodiment is the gradient feedback (GFB) algorithm used in the prior art. The GFB embodiment uses a typical adaptive filtering approach. Based on the same AR1 fading model, the GFB algorithms have shown superior performance compared to other vector quantization based beamforming algorithms. To compare the bit error performance of our successive beamformer with that of the GFB algorithm, we carried out a series of experiments for a system with parameters $N_t=4$ and $N=4$. In the latest orthogonal projection based GFB algorithm (GFBOP) of the prior art, two feedback bits are used to select one out of several random perturbations on the transmit weight. Meanwhile, our successive beamforming embodiment requires $N=4$ feedback bits per update. Since the number of feedback bits are different, the adaptation interval of the different beamforming embodiment is adjusted for fair comparison, i.e., the GFBOP embodiment and our successive beamforming system embodiments are updated every two and four frames, respectively. The key adaptation parameters $\alpha=[0:9970; 0:9704]$ and $\beta=0:316$ are adopted for the GFBOP embodiment.

Figure 11:
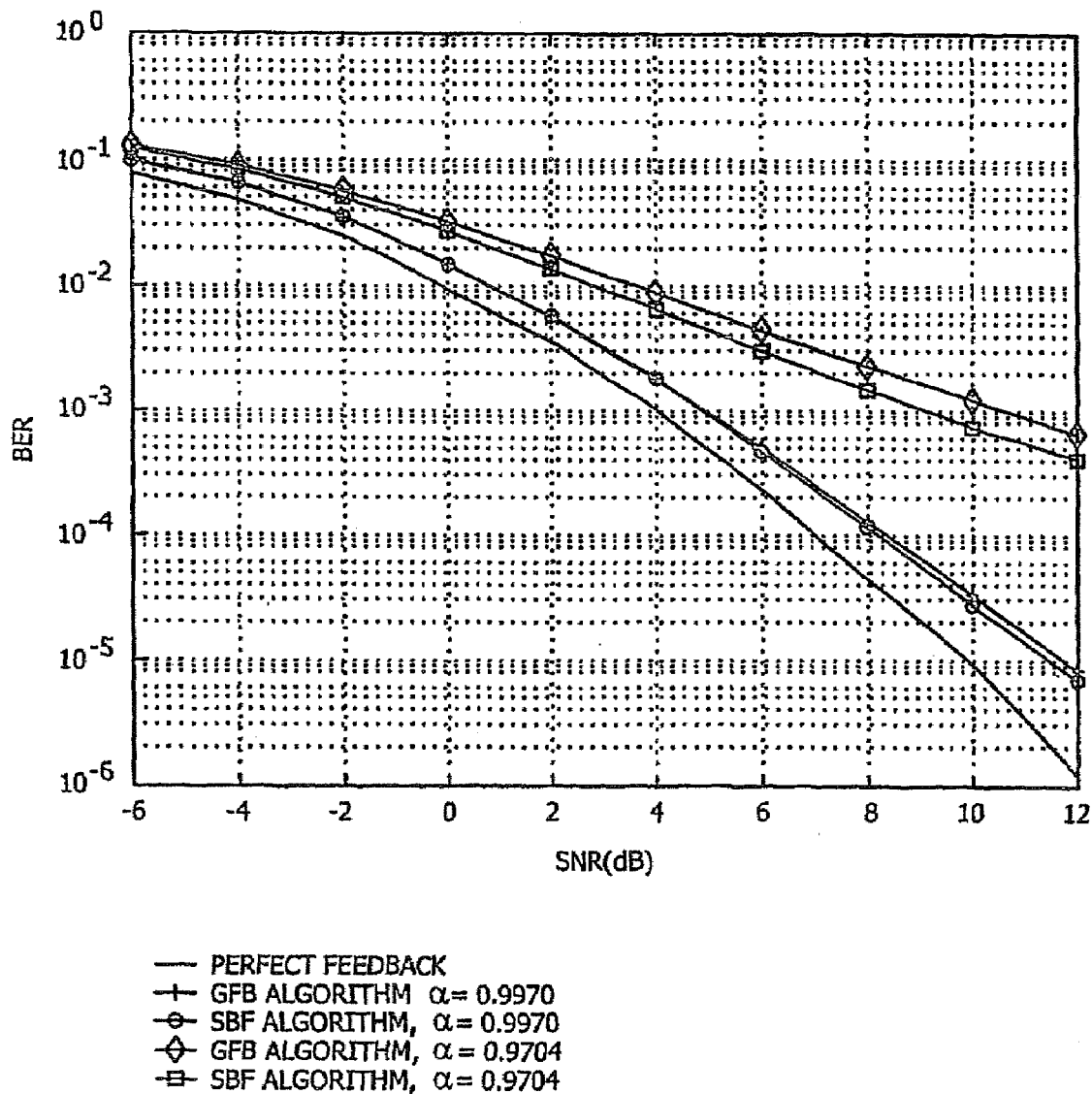
FIG. 11 is a graph comparing the bit error ratios (BER) of a GFB algorithm and SBF algorithm of the invention for an AR1 channel for a plurality of mobile speeds as a function of SNR for a time varying fading channel in a numerical simulation of the invention where the number of transmit antennas $N_t=4$ and the number of feedback bits, $N=4$ and $\eta=0:8702$.

For our successive beamforming system embodiment, the key codebook generation parameter is set to be $\eta=0:8702$ for all the different signal-to-noise ratios. The BER-signal-to-noise ratio curves for the above beamforming embodiments are summarized in the graph of FIG. 11. At the slow fading case ($\alpha=0:9970$ case), the GFB algorithm comes close to the successive beamforming embodiment. At the faster fading case ($\alpha=0:9704$ case), the GFB embodiment becomes inferior to our successive beamforming embodiment.

The performance gain from our successive beamforming embodiment is not surprising, since the weight update in the GFB algorithm is based on the random perturbation on the transmit weight. Therefore, the beamforming weight is not guaranteed to follow the steepest descent path at each adaptation. On the other hand, our successive beamforming algorithm always chooses the most favorite direction from the $2^N$ transmit weights at each adaptation. In general, our algorithm follows the channel in a more efficient manner and hence it works better for faster fading cases. It is also worth mentioning that, the GFB algorithm requires that the randomly generated weight perturbation being transmitted on the forward pilot link. Therefore, the GFB embodiment consumes considerable amount of bandwidth and power resources at the transmitter 16. Our successive beamforming embodiment, on the other hand, does not have such requirement. Therefore, the successive beamforming system algorithm enjoys considerable implementation advantages over the GFB embodiment.

In summary, we have disclosed above a beamformer design problem based on a simple AR1 fading model. To exploit the time domain correlation in the channel fading, we associate the beamforming problem with a predictive vector quantization problem. We have constructed a predictive vector quantization beamformer which accomplishes superior power delivery. However, the predictive vector quantization beamformer has a high implementation complexity. To simplify the implementation, we have developed a novel successive beamforming algorithm as well. The new algorithm is based on a universal adaptive codebook and works at any fading environment. The signal-to-noise ratio performance of the algorithm has been studied analytically and has been found to match the numerical simulation. Monte Carlo simulations have confirmed that the proposed successive beamforming embodiment attains nearly the same signal-to-noise ratio performance as the predictive vector quantization beamformer, yet it enjoys much simpler implementation. The tracking performance of the proposed successive beamforming system algorithm is further enhanced for high signal-to-noise ratio scenarios. Finally, comparison with the memory-less Grassmannian beamformer and the stochastic gradient beamformers confirm that our new beamformer provides the best performance over various fading scenarios.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. An improvement in a method of transmit beamforming between a transmitter and a receiver for a time varying fading channel comprising performing transmit beamforming using less than complete knowledge of the previous fading blocks by beamforming an adaptive codebook of a current fading block with each time frame,
   wherein blocks are transmitted and received in frames and where performing transmit beamforming using less than complete knowledge of the previous fading blocks by beamforming an adaptive codebook of a current fading block with each time frame comprises adjusting the codebook at each frame, and
   wherein channel fading is time varying and where adjusting the codebook at each frame at steady state conditions comprises simultaneously updating $H_{ouse}(W_t-1)$ at both the transmitter and receiver, where $H_{ouse}$ is a Householder matrix.

2. The improvement of claim 1 wherein performing transmit beamforming comprises performing a successive beamforming algorithm.

3. The improvement of claim 1 wherein performing transmit beamforming comprises performing a vector quantization beamforming algorithm.

4. The improvement of claim 1 further comprising determining a fading parameter a in at least the transmitter or receiver by monitoring a mobile Doppler frequency.

5. The improvement of claim 1 wherein performing transmit beamforming using less than complete knowledge of the previous fading blocks by beamforming an adaptive codebook of a current fading block with each time frame comprises generating a best estimated channel direction $\tilde{g}_t$ based on past channel inputs.

6. The improvement of claim 5 wherein generating a best estimated channel direction $\tilde{g}_t$ based on the past channel inputs comprises generating an output $\tilde{g}_t = S(g_{t-1})$ where $S(°)$ denotes a predicting function, $\tilde{g}_t$ denotes a best estimate of the current channel direction based on the previous channel direction $g_{t-1}$.

7. The improvement of claim 1 wherein performing transmit beamforming comprises generating an original channel vector $h_t$, converting the original channel vector $h_t$ into a residue vector $\tilde{e}_t$ in a residue generator in a closed-loop encoder, where $\tilde{e}_t = H_{ouse}(\tilde{g}_t) h_t$ where $H_{ouse}$ is a Householder matrix and $\tilde{g}_t$ denotes a best estimate of the current channel direction based on the previous channel direction $g_{t-1}$.

8. The improvement of claim 7 wherein performing transmit beamforming comprises quantizing the residue vector $\tilde{e}_t$ by a vector quantization block in said closed loop encoder to generate a quantized residue vector denoted as $\hat{v}_t$ based on a minimum distortion criterion using a distance metric $d(°,°)$, where
   $\hat{v}_t = \arg\min_{c_i \in C} d(\tilde{e}_t, c_i)$, and C is a codebook, C= $\{c_1, \ldots, c_N\}$.

9. The improvement of claim 1 wherein performing transmit beamforming comprises generating a reconstructed channel direction $\hat{g}_t$ in a reconstruction unit in a closed-loop encoder according to $\hat{g}_t = H_{ouse}(\tilde{g}_t) \hat{v}_t$ where $\hat{v}_t$ is a quantized residue vector, $H_{ouse}$ is a Householder matrix, and $\tilde{g}_t$ denotes a best estimate of the current channel direction based on the previous channel direction $g_{t-1}$.

10. The improvement of claim 6 wherein performing transmit beamforming further comprises generating an original channel vector $h_t$, converting the original channel vector $h_t$ into a residue vector $\tilde{e}_t$ in a residue generator in a closed-loop encoder, where
    $\tilde{e}_t = H_{ouse}(\tilde{g}_t) h_t$ where $H_{ouse}$ is a Householder matrix; generating a reconstructed channel direction $\hat{g}_t$ in a reconstruction unit in the closed-loop encoder according to $\hat{g}_t = H_{ouse}(\tilde{g}_t) \hat{v}_t$ and feeding back $\tilde{g}_t$ the best estimate of the current channel direction $\tilde{g}_t$ based on the previous channel direction $g_{t-1}$ to the residue generator and to the reconstruction unit in the closed loop encoder.

11. The improvement of claim 1 wherein performing transmit beamforming comprises receiving a feedback signal, $i_t$, inverse quantizing the feedback signal, $i_t$, to generate a quantized residue vector denoted as $\hat{v}_t$ based on a minimum distortion criterion using a distance metric $d(°,°)$, where $\hat{v}_t = \arg\min_{c_i \in C} d(\tilde{e}_t, c_i)$, and C is a codebook, C= $\{C_1, \ldots, C_N\}$ generating a reconstructed channel direction $\hat{g}_t$ in a reconstruction unit in a closed-loop decoder according to, $\hat{g}_t = H_{ouse}(\tilde{g}_t) \hat{v}_t$, and feeding back the best estimate of the current channel direction $\tilde{g}_t$ based on the previous channel direction $g_{t-1}$ to the reconstruction unit in the closed loop decoder.

12. The improvement of claim 8 wherein quantizing the residue vector $\tilde{e}_t$ by a vector quantization block in said closed-loop encoder comprises generating a closed-loop vector quantization codebook using a Loyd training algorithm.

13. The improvement of claim 12 wherein generating a closed-loop vector quantization codebook using a Lloyd training algorithm comprises
    a routine, the routine comprising initializing an optimal predictor based on an open-loop analysis, generating an initial vector quantization codebook, quantizing the residue vectors from the residue generator using a current codebook in the vector quantization unit, grouping the residue vectors that belong to a particular codebook entry will be grouped into a cluster, i.e., $\tilde{e}_t \in \theta_i$ if i=$\min_{c_i C} \bar{d}(\tilde{e}_t, c_i)$ where $\theta_i$ denotes the collection of residue vectors that are quantized using the same codebook entry $c_i$, determining a new centroid using a minimum distortion criterion, replacing prior codebook entries with the new centroid $c_i^{NEW}$; i=1; ...; $2^N$ to provide a new vector quantization codebook; and
    repeating the routine until a convergence threshold is satisfied.

14. The improvement of claim 13 wherein determining a new centroid using a minimum distortion criterion comprises generating new codebook entries, $c_i^{new}$ as modeled by $$c_i^{new} = \arg\min_{\forall \|c\|=1} \sum_{\forall \tilde{e}_t \in \Theta_i} \bar{d}(\tilde{e}_t, c) = \arg\min_{\forall \|c\|=1} - \sum_{\forall \tilde{e}_t \in \Theta_i} |\tilde{e}_t^H c|^2.$$

by solving for an eigenvector that corresponds to the largest eigenvalue of the matrix $R_i = \Sigma_{\forall \tilde{e}_t \in \Theta_i} (\overline{\tilde{e}_t^H \tilde{e}_t})$.

15. The improvement of claim 1 wherein channel fading is static and where adjusting the codebook at each frame comprises generating a codebook with an average signal-to-noise ratio level at the $t^{th}$ frame with codebook $C_2 = \{c_{i,t}; 1 \leq i \leq 2^N\}$ approximated as:

$$SNR_2 \approx \frac{E_s}{\sigma^2}(N_t - \beta_2(N_t - 1)),$$

where $\beta_2 \triangleq \beta(\frac{1}{2}^N)^{1/(N_t-1)}$.

16. The improvement of claim 1 wherein channel fading is time varying and where adjusting the codebook at each frame at steady state conditions comprises generating a codebook with an average signal-to-noise ratio level at the $t^{th}$ frame with codebook $C_i = \{c_{it}; 1 \leq i \leq 2^N\}$ approximated as:

$$SNR_{steady} = \frac{E_s}{\sigma^2}\left(N_t - \frac{(1-\alpha^2)(N_t-1)}{1 - \frac{\alpha^2}{(1/2^N)^{\frac{1}{N_t-1}}}}\right).$$

where $\alpha$ is the fading parameter.

17. The improvement of claim 1 wherein channel fading is time varying and where adjusting the codebook at each frame at steady state conditions comprises generating a codebook with an average signal-to-noise ratio level at the $t^{th}$ frame with codebook $C_i = \{c_{it}; 1 \leq i \leq 2^N\}$ approximated as:

$$C_t = \{c_{it} = H_{ouse}(w_{t-1})[\eta e_1 + \sqrt{1-\eta^2} f_i], 1 \leq i \leq 2^N\}$$

where $H_{ouse}$ is a Householder matrix and $f_i = [0 \ \hat{f}_i]^T$, $i=1,\ldots,2^N$ are $N_t \times 1$ column vectors, $\hat{f}_i \triangleq [\hat{f}_{i1} \ldots \hat{f}_{i(N_t-1)}]^T$, $i=1,\ldots,2^N$ are constant $(N_t-1) \times 1$ column vectors with unit norm, where q is a scalar parameter and its value is given by $$\eta = \sqrt{1 - \frac{\beta_{steady}}{\left(1 + \sqrt{\frac{1-\xi_{max}}{2}}\right)^2}},$$

and $\xi_{max} \triangleq \max_{\forall i,j} Re(\hat{f}_i^H \hat{f}_j)$.

18. The improvement of claim 1 wherein channel fading is time varying and where adjusting the codebook at each frame at steady state conditions comprises simultaneously generating an identical universal codebook $\hat{F}$ in the transmitter and receiver.

19. The improvement of claim 17 wherein generating a codebook comprises generating a universal codebook satisfying the criterion:

$$\hat{F} = \underset{\forall \hat{F}}{\operatorname{argmin}} \xi_{max} = \underset{\forall \hat{F}}{\operatorname{argmin}} \max_{1 \leq i,j \leq N} Re\left(\hat{f}_i^H \hat{f}_j\right).$$

20. A method of closed-loop encoding for transmitting a beamforming signal using less than complete knowledge of the previous fading blocks by beamforming a adaptive codebook of a current fading block with each time frame comprising:

generating an original channel vector $h_t$;
converting the original channel vector $h_t$ into a residue vector $\tilde{e}_t$ in a residue generator in a closed-loop encoder, where $\tilde{e}_t = H_{ouse}(\tilde{g}_t)h_t$ where $H_{ouse}$ is a Householder matrix;
quantizing the residue vector $\tilde{e}_t$ by a vector quantization block in the closed-loop encoder to generate a quantized residue vector denoted as $\hat{v}_t$ based on a minimum distortion criterion using a distance metric $d(\circ, \circ)$, where $$\hat{v}_t = \underset{c_i \in C}{\operatorname{argmin}} \bar{d}(\tilde{e}_t, c_i)$$

and C is a codebook, $C = \{C_1, \ldots, C_N\}$ and to generate a feedback signal it from the vector quantization block;
generating a reconstructed channel direction $\hat{g}_t$ in a reconstruction unit in the closed loop encoder according to $\hat{g}_t = H_{ouse}(\tilde{g}_t)\hat{v}_t$;
generating a best estimated channel direction $\tilde{g}_t$ based on the past channel inputs by generating an output $\tilde{g}_t = S(g_{t-1})$ where $S(\circ)$ denotes a predicting function, $\tilde{g}_t$ denotes a best estimate of the current channel direction based on the previous channel direction $g_{t-1}$; and
feeding back $\tilde{g}_t$ the best estimate of the current channel direction based on the previous channel direction $g_{t-1}$ to the residue generator and to the reconstruction unit in the closed loop encoder,
wherein blocks are transmitted in frames and where performing transmit beamforming using less than complete knowledge of the previous fading blocks by beamforming an adaptive codebook of a current fading block with each time frame comprises adjusting the codebook at each frame, and
wherein channel fading is time varying and where adjusting the codebook at each frame at steady state conditions comprises simultaneously updating House($W_t$−1) at the closed-loop encoder.

21. A method for closed-looped decoding by receiving a beamforming signal using less than complete knowledge of the previous fading blocks by beamforming a adaptive codebook of a current fading block with each time frame comprising:

receiving the feedback signal, $i_t$;
inverse quantizing the feedback signal, $i_t$, to generate a quantized residue vector denoted as $\hat{e}_t$ on a minimum distortion criterion using a distance metric $d(\circ, \circ)$, where $$\hat{v}_t = \underset{c_i \in C}{\operatorname{argmin}} \bar{d}(\tilde{e}_t, c_i)$$

and C is a codebook, $C = \{C_1, \ldots, C_N\}$;
generating a reconstructed channel direction $\hat{g}_t$ in a reconstruction unit in a closed-loop decoder according to $\hat{g}_t = H_{ouse}(\tilde{g}_t)\hat{v}_t$; and
feeding back the best estimate of the current channel direction $\tilde{g}_t$ based on the previous channel direction $g_{t-1}$ to the reconstruction unit in the closed loop decoder,
wherein blocks are received in frames and where performing receive beamforming using less than complete knowledge of the previous fading blocks by beamforming an adaptive codebook of a current fading block with each time frame comprises adjusting the codebook at each frame, and
wherein channel fading is time varying and where adjusting the codebook at each frame at steady state conditions comprises simultaneously updating $H_{ouse}(W_t-1)$ at the closed-loop decoder.

22. The improvement of claim 1 wherein performing transmit beamforming, comprises constructing a time-varying beamforming codebook based on less than complete knowledge from a previous fading block.

23. The improvement of claim 1 wherein performing transmit beamforming comprises selecting a transmit weight from a previous fading block to carry out transmit beamforming on a current fading block with each time frame.

24. The improvement of claim 1 wherein performing transmit beamforming comprises performing a successive beamforming embodiment with only a single codebook required in both the transmitter and receiver without multiple codebooks for different fading speeds.

25. An improvement in a wireless system including a transmitter and a receiver with a time varying fading channel comprising means for performing transmit beamforming using less than complete knowledge of the previous fading blocks by beamforming a adaptive codebook of a current fading block with each time frame,
  wherein blocks are transmitted and received in frames and where the means for performing transmit beamforming using less than complete knowledge of the previous fading blocks by beamforming an adaptive codebook of a current fading block with each time frame comprises means for adjusting the codebook at each frame, and
  wherein the means for adjusting the codebook at each frame at steady state conditions comprises simultaneously updating $H_{ouse}(W_t-1)$ at both the transmitter and receiver where $H_{ouse}$ is a Householder matrix.

26. The improvement of claim 25 wherein the means for performing transmit beamforming comprises means for performing a successive beamforming algorithm.

27. The improvement of claim 25 wherein the means for performing transmit beamforming comprises means for performing a vector quantization beamforming algorithm.

28. The improvement of claim 25 further comprising means for determining a fading parameter α in at least the transmitter or receiver by monitoring a mobile Doppler frequency.

29. The improvement of claim 25 wherein means for performing transmit beamforming using less than complete knowledge of the previous fading blocks by beamforming an adaptive codebook of a current fading block with each time frame comprises means for generating a best estimated channel direction $\tilde{g}_t$ based on past channel inputs.

30. The improvement of claim 25 wherein the means for generating a best estimated channel direction $\tilde{g}_t$ based on the past channel inputs comprises means for generating an output $\tilde{g}_t = S(g_{t-1})$ where $S(°)$ denotes a predicting function, $\tilde{g}_t$ denotes a best estimate of the current channel direction based on the previous channel direction ($g_{t-1}$).

31. The improvement of claim 25 wherein the means for performing transmit beamforming comprises means for generating an original channel vector $h_t$, and a residue generator means for converting the original channel vector $h_t$ into a residue vector $\tilde{e}_t$, where $\tilde{e}_t = H_{ouse}(\tilde{g}_t)h_t$ where $H_{ouse}$ is a Householder matrix.

32. The improvement of claim 31 wherein the means for performing transmit beamforming comprises vector quantization means for quantizing the residue vector $\tilde{e}_t$ to generate a quantized residue vector denoted as $\hat{v}_t$, based on a minimum distortion criterion using a distance metric $d(°, °)$, where $$\hat{v}_t = \underset{c_i \in C}{\arg\min}\, \overline{d}(\tilde{e}_t, c_i)$$

and C is a codebook, $C=\{C_1, \ldots, C_N\}$.

33. The improvement of claim 25 wherein the means for performing transmit beamforming comprises reconstruction means for generating a reconstructed channel direction $\hat{g}_t$, according to $\hat{g}_t = H_{ouse}(\tilde{g}_t)\hat{v}_t$ where $\hat{v}_t$ is a quantized residue vector, $H_{ouse}$ is a Householder matrix, and $\tilde{g}_t$ denotes a best estimate of the current channel direction based on the previous channel direction $g_{t-1}$.

34. The improvement of claim 30 wherein the means for performing transmit beamforming comprises residue generator means for generating an original channel vector $h_t$, means for converting the original channel vector $h_t$ into a residue vector $\tilde{e}_t$ where $\tilde{e}_t = H_{ouse}(\tilde{g}_t)h_t$ where $H_{ouse}$ is a Householder matrix, reconstruction means for generating a reconstructed channel direction $\hat{g}_t$, according to $\hat{g}_t = H_{ouse}(\tilde{g}_t)\hat{v}_t$, and means for feeding back the $\tilde{g}_t$, the best estimate of the current channel direction based on the previous channel direction $g_{t-1}$ to the residue generator means and to the reconstruction means.

35. The improvement of claim 25 wherein the means for performing transmit beamforming comprises means for receiving a feedback signal, $i_t$, means for inverse quantizing the feedback signal, $i_t$, to generate a quantized residue vector is denoted as $\hat{v}_t$, based on a minimum distortion criterion using a distance metric $d(°, °)$, where $$\hat{v}_t = \underset{c_i \in C}{\arg\min}\, \overline{d}(\tilde{e}_t, c_i),$$

and C is a codebook, $C=\{C_1, \ldots, C_N\}$, reconstruction means for generating a reconstructed channel direction $\hat{g}_t$, according to $\hat{g}_t = H_{ouse}(\tilde{g}_t)\hat{v}_t$ and means for feeding back the best estimate of the current channel direction $\tilde{g}_t$ based on the previous channel direction $g_{t-1}$ to the reconstruction means.

36. The improvement of claim 32 wherein the vector quantization means for quantizing the residue vector $\tilde{e}_t$ comprises means for generating a closed-loop vector quantization codebook using a Lloyd training algorithm.

37. The improvement of claim 36 wherein the means for generating a closedloop vector quantization codebook using a Lloyd training algorithm comprises means for initializing an optimal predictor based on an open-loop analysis, means for generating an initial vector quantization codebook, means for quantizing the residue vectors from the residue generator means using a current codebook in the vector quantization means, means for grouping the residue vectors that belong to a particular codebook entry will be grouped into a cluster, i.e., $\tilde{e}_t \in \theta_i$ if $i=\min_{c_i \in C}\, \overline{d}(\tilde{e}_t, c_j)$ where $\theta_i$ denotes the collection of residue vectors that are quantized using the same codebook entry $c_i$, means for determining a new centroid using a minimum distortion criterion, replacing prior codebook entries with the new centroid $C^{NEW}_i$; i=1; . . . ; $2^N$ to provide a new vector quantization codebook; and means for repeating operational cycles of each of the foregoing means until a convergence threshold is satisfied.

38. The improvement of claim 37 wherein the means for determining a new centroid using a minimum distortion criterion comprises generating new codebook entries, $c_{j,new}$ as modeled by $$c_i^{new} = \underset{\forall \|c\|=1}{\arg\min} \sum_{\forall \tilde{e}_t \in \Theta_i} \overline{d}(\tilde{e}_t, c) = \underset{\forall \|c\|=1}{\arg\min} - \sum_{\forall \tilde{e}_t \in \Theta_i} |\tilde{e}_t^H c|^2.$$

by solving for an eigenvector that corresponds to the largest eigenvalue of the matrix $R_i \Sigma_{\forall \tilde{e}_t \in \Theta_i} (\overline{\tilde{e}_t^H \tilde{e}_t})$.

39. The improvement of claim 25 wherein channel fading is static and where the means for adjusting the codebook at each frame comprises means for generating a codebook with an average signal-to-noise ratio level at the $t^{th}$ frame with codebook $C_2=\{c_{i,t}; 1 \leq i \leq 2^N\}$ approximated as:

$$SNR_2 \approx \frac{E_s}{\sigma^2}(N_t - \beta_2(N_t - 1)),$$

where $\beta_2 \triangleq \beta(\frac{1}{2}^N)^{1/(n_t-1)}$.

40. The improvement of claim 25 wherein channel fading is time varying and where the means for adjusting the codebook at each frame at steady state conditions comprises means for generating a codebook with an average signal-to-noise ratio level at the $t^{th}$ frame with codebook $C_t=\{c_{it}; 1 \leq i \leq 2^N\}$ approximated as:

$$SNR_{steady} = \frac{E_s}{\sigma^2}\left(N_t - \frac{(1-\alpha^2)(N_t-1)}{1 - \frac{\alpha^2}{(1/2^N)^{\frac{1}{N_t-1}}}}\right).$$

where $\alpha$ is the fading parameter.

41. The improvement of claim 29 wherein channel fading is time varying and where the means for adjusting the codebook at each frame at steady state conditions comprises means for generating a codebook with an average signal-to-noise ratio level at the $t^{th}$ frame with codebook $C_t=\{c_{it}; 1 \leq i \leq 2^N\}$ approximated as:

$$C_t = \{c_{it} = H_{ouse}(w_{t-1})[\eta e_1 + \sqrt{1-\eta^2} f_i], 1 \leq i \leq 2^N\}$$

where $H_{ouse}$ is a Householder matrix and $f_i = [0 \; \hat{f}_i]^T$, $i=1,\ldots,2^N$ are $N_t \times 1$ column vectors, $\hat{f}_i \triangleq [f_{i1} \ldots f_{i(N_{t-1})}]^T$, $i=1,\ldots,2^N$ are constant $(N_t-1) \times 1$ column vectors with unit norm, where $\eta$ is a scalar parameter and its value is given by $$\eta = \sqrt{1 - \frac{\beta_{steady}}{\left(1+\sqrt{\frac{1-\xi_{max}}{2}}\right)^2}}, \quad (32)$$

and $\xi_{max} \triangleq \max_{\forall i,j} Re(\hat{f}_i^H \hat{f}_j)$.

42. The improvement of claim 25 wherein channel fading is time varying and where the means for adjusting the codebook at each frame at steady state conditions comprises means for simultaneously generating an identical universal codebook $\hat{F}$ in the transmitter and receiver.

43. The improvement of claim 41 wherein the means for generating a codebook comprises means for generating a universal codebook satisfying the criterion:

$$\hat{F} = \underset{\forall \hat{F}}{\operatorname{argmin}} \xi_{max} = \underset{\forall \hat{F}}{\operatorname{argmin}} \max_{1 \leq i,j \leq N} Re(\hat{f}_i^H \hat{f}_j).$$

44. A closed-loop encoder for transmitting a beamforming signal using less than complete knowledge of the previous fading blocks by beamforming a adaptive codebook of a current fading block with each time frame comprising:
a residue generator for converting an original channel vector $h_t$ into a residue vector $\tilde{e}_t$ where $\tilde{e}_t = H_{ouse}(\tilde{g}_t)h_t$ where $H_{ouse}$ is a Householder matrix;
a vector quantizer coupled to the residue generator for converting the residue vector $\tilde{e}_t$ to a quantized residue vector denoted as $\hat{v}_t$ based on a minimum distortion criterion using a distance metric $d(\circ,\circ)$, where $$\hat{v}_t = \underset{c_i \in C}{\operatorname{argmin}} \overline{d}(\tilde{e}_t, c_i)$$

and C is a codebook, $C=\{C_1,\ldots,C_N\}$ and for generating a feedback signal $i_t$ from the vector quantization block;
a reconstruction unit coupled to the vector quantizer for receiving the quantized residue vector $\hat{v}_t$, and for generating a reconstructed channel direction $\hat{g}_t$ according to $\hat{g}_t = H_{ouse}(\tilde{g}_t)\hat{v}_t$; and
a linear vector predictor coupled to the reconstruction unit for generating a best estimated channel direction $\tilde{g}_t$ based on the past channel inputs by generating an output $\tilde{g}_t = S(g_{t-1})$ where $S(\circ)$ denotes a predicting function $\tilde{g}_t$ denotes a best estimate of the current channel direction based on the previous channel direction $g_{t-1}$ and for feeding back $\tilde{g}_t$ the best estimate of the current channel direction based on the previous channel direction $g_{t-1}$ to the residue generator and to the reconstruction unit,
wherein blocks are transmitted and received in frames and where the closed-loop encoder transmitting a beamforming using less than complete knowledge of the previous fading blocks by beamforming an adaptive codebook of a current fading block with each time frame comprises means for adjusting the codebook at each frame, and
wherein the means for adjusting the codebook at each frame at steady state conditions comprises simultaneously updating $H_{ouse}(W_t-1)$ at the cloded-loop encoder where $H_{ouse}$ is a Householder matrix.

45. A closed-looped decoder for receiving a beamforming signal using less than complete knowledge of the previous fading blocks by beamforming a adaptive codebook of a current fading block with each time frame comprising:
an inverse quantizer for receiving the feedback signal $i_t$ to generate a quantized residue vector denoted as $\hat{v}_t$ based on a minimum distortion criterion using a distance metric $d(\circ,\circ)$, where $$\hat{v}_t = \underset{c_i \in C}{\operatorname{argmin}} \overline{d}(\tilde{e}_t, c_i)$$

and C is a codebook, $C=\{C_1,\ldots,C_N\}$;
a codebook unit coupled to the inverse quantizer for storing and providing the inverse quantizer with a current value of the codebook $C=\{C_1,\ldots,C_N\}$;
a reconstruction unit coupled to the inverse quantizer for generating a reconstructed channel direction $\hat{g}_t$, according to $\hat{g}_t = H_{ouse}(\tilde{g}_t)\hat{v}_t$; and
a linear vector predictor coupled to the reconstruction unit coupled to the reconstruction unit for feeding back a best estimate of the current channel direction $\tilde{g}_t$ based on the previous channel direction $g_{t-1}$ to the reconstruction unit,
wherein blocks are received in frames and where the closed-loop decoder receiving a beamforming using less than complete knowledge of the previous fading blocks by beamforming an adaptive codebook of a current fading block with each time frame comprises means for adjusting the codebook at each frame, and
wherein the means for adjusting the codebook at each frame at steady state conditions comprises simultaneously updating $H_{ouse}(W_t-1)$ at the cloded-loop decoder where $H_{ouse}$ is a Householder matrix.

* * * * *